United States Patent
Pfeifer et al.

(10) Patent No.: US 10,762,117 B2
(45) Date of Patent: Sep. 1, 2020

(54) AGGREGATING RESULTS FROM NAMED ENTITY RECOGNITION SERVICES

(71) Applicant: SAP SE, Walldorf (DE)

(72) Inventors: Katja Pfeifer, Dresden (DE); Johannes Meinecke, Dresden (DE)

(73) Assignee: SAP SE, Walldorf (DE)

( * ) Notice: Subject to any disclaimer, the term of this patent is extended or adjusted under 35 U.S.C. 154(b) by 398 days.

(21) Appl. No.: 15/635,098

(22) Filed: Jun. 27, 2017

(65) Prior Publication Data

US 2017/0293682 A1    Oct. 12, 2017

Related U.S. Application Data

(63) Continuation of application No. 14/093,227, filed on Nov. 29, 2013, now Pat. No. 9,721,002.

(51) Int. Cl.
G06F 16/33    (2019.01)
G06F 16/338   (2019.01)
G06F 40/295   (2020.01)

(52) U.S. Cl.
CPC ........ *G06F 16/3344* (2019.01); *G06F 16/338* (2019.01); *G06F 16/3331* (2019.01); *G06F 40/295* (2020.01)

(58) Field of Classification Search
CPC ............. G06F 16/3331; G06F 16/3344; G06F 16/338; G06F 17/278; G06F 17/30696;
(Continued)

(56) References Cited

U.S. PATENT DOCUMENTS 9,535,902 B1 *  1/2017  Michalak ................ G06F 16/38
2006/0047691 A1 *  3/2006  Humphreys .......... G06F 40/295
(Continued)

FOREIGN PATENT DOCUMENTS

EP          2645309       10/2013
WO    WO-2015080558 A1 *  6/2015  ........... G06F 17/278

OTHER PUBLICATIONS

Alias-i, "LingPipe 4.1.0," downloaded from http://alias-i.com/lingpipe, 2 pp. (Jul. 2013).
(Continued)

*Primary Examiner* — James E Richardson
(74) *Attorney, Agent, or Firm* — Klarquist Sparkman, LLP

(57) ABSTRACT

An aggregation service aggregates extraction results from diverse named entity recognition ("NER") services, which can help improve the quality of extracted information. In some cases, the aggregation service considers differences in entity type classifications when aggregating extraction results from different NER services. The aggregation service can also consider performance characteristics (e.g., error rates) for the different NER services. For example, the aggregation service receives extraction results generated for a document corpus according to an entity type schema for each of multiple different NER services, then aggregates the extraction results based at least in part on relations between entity types for the NER services. For a given annotation area, the computing system can identify hypotheses and rank the hypotheses according to an aggregation approach. For some types of aggregation approach, the computing system uses weight values, error path values and/or other performance characteristics determined during training for the NER services.

20 Claims, 9 Drawing Sheets

(58) Field of Classification Search
CPC ......... G06F 17/30684; G06F 17/30657; G06F 40/295

See application file for complete search history.

(56) References Cited

U.S. PATENT DOCUMENTS

| | | | |
|---|---|---|---|
| 2010/0262836 | A1 | 10/2010 | Peukert et al. |
| 2011/0131253 | A1 | 6/2011 | Peukert et al. |
| 2011/0213742 | A1 | 9/2011 | Lemmond et al. |
| 2011/0219044 | A1 | 9/2011 | Peukert |
| 2012/0259896 | A1 | 10/2012 | Peukert |
| 2013/0238531 | A1 | 9/2013 | Seidler et al. |
| 2014/0006208 | A1 | 1/2014 | Fuhge et al. |
| 2014/0006304 | A1 | 1/2014 | Neumann et al. |
| 2014/0365525 | A1 | 12/2014 | Pfeifer et al. |
| 2015/0100524 | A1* | 4/2015 | Pantel .................. G06F 16/332 706/12 |
| 2015/0154186 | A1 | 6/2015 | Meinecke et al. |
| 2015/0154261 | A1 | 6/2015 | Meinecke et al. |
| 2015/0347528 | A1 | 12/2015 | Jugel et al. |
| 2016/0004516 | A1 | 1/2016 | Ivanov et al. |
| 2020/0090033 | A1* | 3/2020 | Ramachandran ........ G06N 3/08 |

OTHER PUBLICATIONS

Chen et al., "Aggregating Semantic Annotators," *Proceedings of the VLDB Endowment*, vol. 6, No. 1497, pp. 1486-1497 (Aug. 2013).

Chen et al., "ROSeAnn: Reconciling Opinion of Semantic Annotators," *Proceedings of the VLDB Endowment*, vol. 6, No. 12, pp. 1238-1241 (Aug. 2013).

Duong et al., "Support Vector Machines to Weight Voters in a Voting System of Entity Extractors," *International Joint Conf. on Neural Networks*, pp. 1226-1230 (Jul. 2006).

Florian et al., "Named Entity Recognition Through Classifier Combination," *Proc. of the Seventh Conference on Natural language learning*, pp. 168-171 (May 2003).

Grimes, "Unstructured Data and the 80 percent Rule," downloaded from http://breakthroughanalysis.com/2008/08/01/unstructured-data-and-the-80-percent-rule/, 4 pp. (Aug. 2008).

Hassel et al, "Ontology-driven automatic entity disambiguation in unstructured text," *Proceedings in the 5th Conference on the Semantic Web*, pp. 44-57 (2006).

Kozareva et al., "Combining Data-Driven Systems for Improving Named Entity Recognition," *Journal of Data & Knowledge Engineering*, vol. 61, No. 3, pp. 449-466 (Jun. 2007).

Kuncheva, *Combining Pattern Classifiers: Methods and Algorithms*, 360 pp. (2004), John Wiley & Sons, Inc.

Lemmond et al., "Enhanced Named Entity Extraction via Error-Driven Aggregation," *International Conf. on Data Mining*, 9 pp. (Feb. 2010).

Peukert et al., "A Self-Configuring Schema Matching System," *IEEE 28th International Conference on Data Engineering*, pp. 306-317 (Apr. 2012).

Pfeifer et al., "Semantic Description of Text Mining Services," *The Second International Conference on Advances in Information Mining and Management*, pp. 21-26 (Oct. 2012).

Pfeifer et al., "Mapping Text Mining Taxonomies," *Proc. of the International Conference on Knowledge Discovery and Information Retrieval*, 12 pp. (Sep. 2013).

Pfeifer, et al. "Identifying the Truth—Aggregation of Named Entity Extraction Results," *Proceedings of International Conference on Information Integration and Web-based Applications & Services*. ACM, Dec. 2, 2013, p. 565 (10 pages).

Popov et al., "KIM—Semantic Annotation Platform," *Proceedings of the Second International Semantic Web Conference*, pp. 834-849 (2003).

Rizzo et al., "NERD: A Framework for Unifying Named Entity Recognition and Disambiguation Extraction Tools," *Proc. of the 13th Conf. of the European Chapter of the Association for Computational Linguistics*, pp. 73-76 (Apr. 2012).

Sarawagi, "Information Extraction," *Foundations and Trends in Databases*, vol. 1, No. 3, pp. 261-377 (Mar. 2008).

Seidler et al., "Service-Oriented Information Extraction," *Joint EDBT/ICDT Ph.D. Workshop*, 7 pp. (Mar. 2011).

Si et al., "Boosting Performance of Bio-Entity Recognition by Combining Results from Multiple Systems," *Proc. of the 5th International Workshop on Bioinformatics*, pp. 76-83 (Aug. 2005).

Voyer et al., "A Hybrid for Annotating Named Entity Training Corpora," *Proceedings of the Fourth Linguistic Annotation Workshop (Law IV '10)*, pp. 243-246 (2010).

Wu et al., "A Stacked, Voted, Stacked Model for Named Entity Recognition," *Proc. of the 7th Conference on Natural language learning*, pp. 200-203 (May 2003).

\* cited by examiner software 180 implementing one or more innovations for aggregating results from named entity recognition (NER) services

NER service output $D_x$ (810):

Ex1: ( [178; 187], Vancouver, *city* )

Ex2: ( )

Ex3: ( [178; 187], Vancouver, *location* )

learned characteristics (821) for Ex1

| annotation | truth $G$ | $p$ |
|---|---|---|
| *city* | *city* | 0.8 |
|  | *NULL* | 0.1 |
|  | not *city* | 0.1 | learned characteristics (822) for Ex2 and Ex3

| annotation | truth $G$ | $p$ |
|---|---|---|
| *location* | *location* | 0.7 |
|  | *NULL* | 0.1 |
|  | not *location* | 0.2 | false negative (fn) rate (823) for Ex2

| truth $G$ | fn rate |
|---|---|
| *location* | 0.3 |
| ALL | 0.2 | hypotheses (831) $\Omega_x$:

$H_{1x}$ : []

**$H_{2x}$ : [178, 187, Vancouver, *city*]**

$H_{3x}$ : [178, 187, Vancouver, *location*]

$$\hat{P}_k(\tau^{h,d}) = \begin{cases} 1 - \dfrac{\sum_{\tau_i \in T_k^t} I_{\tau_i}(\tau^{!NULL,NULL})}{\sum_{\tau_i \in T_k^t} I_{\tau_i}(\tau^{!NULL,*})} & \text{if } h, d = NULL \\ \dfrac{\sum_{\tau_i \in T_k^t} I_{\tau_i}(\tau^{h,NULL})}{\sum_{\tau_i \in T_k^t} I_{\tau_i}(\tau^{h,*})} & \text{if } d = NULL \\ \dfrac{\sum_{\tau_i \in T_k^t} I_{\tau_i}(\tau^{NULL,d})}{\sum_{\tau_i \in T_k^t} I_{\tau_i}(\tau^{*,d})} & \text{if } h = NULL \\ \dfrac{\sum_{\tau_i \in T_k^t} I_{\tau_i}(\tau^{!NULL,d})}{\sum_{\tau_i \in T_k^t} I_{\tau_i}(\tau^{*,d})} & \text{otherwise} \end{cases}$$

$$\hat{P}_k(e_x | \tau^{h,d}) = \frac{\sum_{\tau_i \in T_k^t} s_{\tau_i}(e_x) \cdot t s_{D,\tau_i}(d)}{\sum_{\tau_i \in T_k^t} t s_{D,\tau_i}(d)}$$

AGGREGATING RESULTS FROM NAMED ENTITY RECOGNITION SERVICES

CROSS REFERENCE TO RELATED APPLICATIONS

The present application is a continuation of co-pending U.S. patent application Ser. No. 14/093,227, filed Nov. 29, 2013, which is incorporated herein by reference in its entirety.

FIELD

An aggregation service aggregates extraction results from diverse named entity recognition services.

BACKGROUND

Text content is found on Web pages, blogs, forums and other areas of the World Wide Web, at social networking sites, and through news feed or message distribution services. A large company may have tens or hundreds of thousands of documents including text content, as well as email archives, archives of invoices and other archives. Much of the available text information is unstructured text, and the amount of unstructured text content is continually growing.

Being able to understand unstructured text content for the purpose of market analysis, analysis of trends or product monitoring can give a competitive advantage to a company. An automatic text processing service helps extract meaningful information from unstructured text content. A named entity recognition ("NER") service is a type of automatic text processing service that converts unstructured text content into structured content, which can be analyzed more easily. Various NER services have been used in the past, and many are integrated into currently available services, including those offered by Extractiv, DBPediaSpotlight, OpenCalais and AlchemyAPI. For text processing, a NER service (1) detects an entity (e.g., person, organization, product, service or other "thing") within text content of a document (e.g., Web page, article, invoice, email, white paper, bldg post, news feed or other object containing information), (2) identifies the location of the entity in the document, and (3) classifies the entity as having an entity type. NER services have particular significance for automatic text processing because named entities and the relations be them typically contain relevant information.

The information extracted by a NER service may be used to support analysis, decision making and strategy development. Important business decisions may be made based on the extracted information. Thus, the accuracy and reliability of the information extracted by a NER service is highly important. In many cases, however, a given NER service, taken by itself, has trouble consistently identifying named entities correctly for different types of documents. In this respect, different NER services have different strengths and weaknesses.

Combining extraction results from several NER services can improve the overall quality of the extracted information. Prior approaches to combining extraction results from diverse NER services have mostly focused on the stage of detecting entities in documents and/or the stage of identifying locations of entities within the documents. These prior approaches have not considered differences in type classification used by different NER services (e.g., the entity types recognized by the NER services, and the relationships among those supported entity types). This can be a problem if the NER services vary in their ability to detect particular types of entities. For example, NER services that perform poorly when detecting and identifying certain entity types may be given too much consideration when aggregating extraction results. It can also be a problem if NER services use different names for the same entity type, or if the NER services apply type classifications with different levels of specificity (e.g., fine-grained versus general). For this reason, prior approaches to combining extraction results from diverse NER services have limited applicability in real-world scenarios.

SUMMARY

In summary, the detailed description presents innovations for aggregating extraction results from diverse named entity recognition ("NER") services. These innovations can help improve the quality of extracted information that is used for further analysis and decision-making. In many of the examples described herein, an aggregation service considers differences between entity type schemas (e.g., entity types supported, entity type hierarchies) when aggregating extraction results from different NER services. The aggregation service can also consider performance characteristics (e.g., error rates for extraction on a given category of documents) for the different NER services when aggregating the extraction results.

According to one aspect of the innovations described herein, an aggregation service receives, for each of multiple different NER services, extraction results generated for a document corpus according to an entity type schema. The entity type schema can be any structured organization of entity types. The document corpus includes one or more documents with text, and the extraction results for a given NER service include entity annotations for the document(s) according to the entity type schema used by the given NER service.

The aggregation service aggregates the extraction results based at least in part on relations between entity types for the multiple different NER services. For example, for the extraction results for a given NER service, the aggregation service transforms, for each of multiple annotations in the extraction results, the entity type of the annotation from the entity type schema of the given NER service to a standardized entity type schema. As part of the aggregation, the aggregation service can also identify and mark relevant annotations in the extraction results, and identify one or more annotation areas in a document, where an annotation area includes one or more annotations in the extraction results that overlap for at least some of the NER services. As part of the aggregation process, the aggregation service uses an aggregation approach to identify an aggregated set of annotations for the extraction results for the NER services. For example, for a given annotation area, the aggregation service identifies a set of one or more hypotheses for the given annotation area, and ranks the one or more hypotheses according to the aggregation approach. The aggregation approach can include extended majority vote analysis, weighted majority vote analysis, simple error path analysis, pairwise error path analysis or another aggregation technique.

For some types of aggregation approach (e.g., simple error path analysis, pairwise error path analysis), the aggregation service uses weight values, error path values and/or other performance characteristics for the respective NER services. The performance characteristics are determined during training, and can be different for different categories of document corpus (e.g., Web pages, invoices, bldg posts).

The innovations for aggregating results from NER services can be implemented as part of a method, as part of a computing system adapted to perform the method or as part of tangible computer-readable media storing computer-executable instructions for causing a computing system to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 8 is a chart showing determination of ranking values in a first stage of aggregation using simple error paths analysis.

FIG. 9 is a pseudocode listing showing determination of probability estimates for a NER service in a second stage of training using simple error paths analysis.

DETAILED DESCRIPTION

Figure 1:
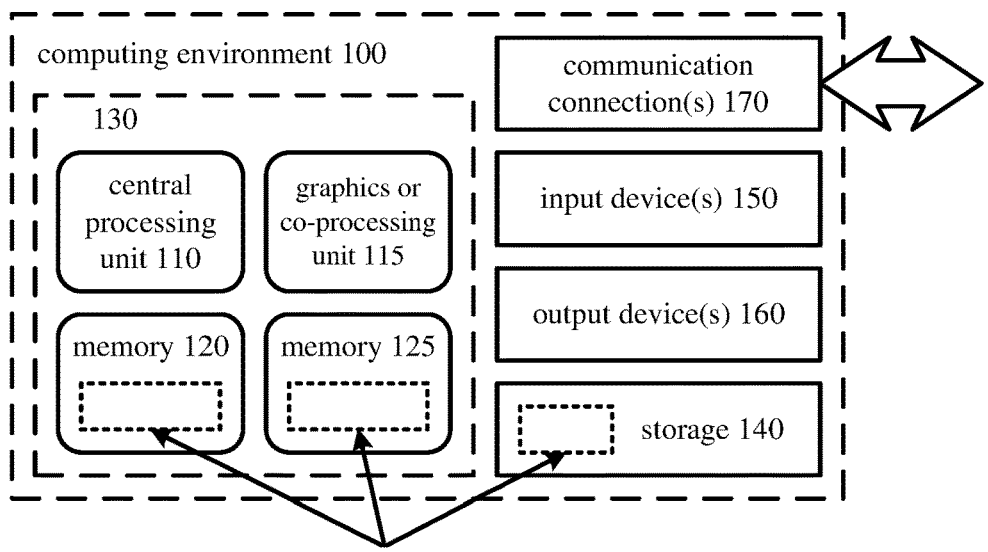
FIG. 1 is a diagram of an example computing system in which some described embodiments can be implemented.

The detailed description presents innovations for aggregating extraction results tier diverse NER services. These innovations can help improve the quality of extracted information that is used for further analysis and decision-making.

For text processing, a NER service (1) detects an entity (e.g., person, organization, product, service or other "thing") within text content of a document (e.g., Web page, article, invoice, email, white paper, blog post, news feed or other object containing information), (2) identifies the location of the entity in the document, and (3) classifies the entity as having an entity type. In many cases, a given NER service, taken by itself, has trouble consistently identifying named entities correctly for different types of documents. In this respect, different NER services have different strengths and weaknesses.

To mitigate the problems associated with using a single NER service, extraction results from multiple NER services can be aggregated. In general, using the extraction results, an aggregation service makes a decision for, or against, a text fragment qualifying as an entity within a document, identifies the specific location of the entity (e.g., by offset in the document and length of the text fragment for the entity), and classifies the identified entity by assigning an entity type. When combining extraction results from NER services, prior aggregation services have not sufficiently considered differences in the entity type classification used by different NER services, nor have they sufficiently considered the performance characteristics of NER services. This can be a problem if the NER services vary in their ability to detect particular types of entities. It can also be a problem if the NER services use different names for the same entity type, or if the NER services apply entity type classifications with different levels of specificity.

In contrast, in many of the examples described herein, an aggregation service considers differences in entity type schemas when aggregating extraction results from different NER services. For example, the aggregation service can account for entity types supported and the relations between the entity types in the entity type schemas applied by different NER services. In addition to incorporating entity type schema information, the aggregation service can consider entity location (that is, region in which an entity is located) when aggregating extraction results from NER services. in example implementations, extraction results for multiple real-world NER services are effectively aggregated.

The aggregation service can also consider performance characteristics (e.g., error rates for extraction) of the different NER services when aggregating the extraction results. Performance characteristics can be determined for different NER service for different entity types, so that the aggregation system gives more weight to entity type classifications by NER services that have successfully classified such entities during prior aggregation tasks. Performance characteristics can be determined for different categories of documents, with the aggregation service selecting appropriate performance characteristics to use during aggregation.

The various aspects of the innovations described herein include, but are not limited to, the following.
1. Aggregating extraction results from heterogeneous NER services for a specific task, incorporating entity type schema information (e.g., entity types supported, entity type hierarchies, relations between different entity type hierarchies).
2. Aggregating extraction results using any of various aggregation approaches, depending on category of documents.
3. Aggregating extraction results using an aggregation approach that leverages learned performance characteristics of NER services. For example, by monitoring discrepancies between (1) detection, identification and classification of entities by a NER service, and (2) extraction results known to be correct, an aggregation service can determine performance characteristics of the NER service. The aggregation service can then use the learned performance characteristics to improve subsequent aggregation.

The innovations described herein can be used in any aggregation service that combines extraction results from multiple NER services, so as to increase the quality of extracted results (and possibly increase the quantity of extracted results, compared to use of a single NER service). In particular, when a special-purpose NER service adapted to a specific category of documents is not available, the aggregation service can help extract meaningful information from the results of multiple general-purpose NER services. For example, the aggregation service can help extract meaningful information when mining text from invoices and emails from customers in a customer relationship management ("CRM") tool, when mining text from blog posts or forum entries, when mining text from Web pages, when mining text from business objects in a database, when mining text from a news feed or message distribution service, or in other scenarios in which. structured information is mined from unstructured text or other unstructured information.

The aggregation service can be exposed as a service that an application or user calls to specify an extraction task. Or, the aggregation service can be incorporated into special-purpose application for monitoring or another purpose.

Some examples described herein involve extracting information about entities such as persons or locations from a CRM database. More generally, the innovations described herein can be applied for any types of entities and documents.

Various alternatives to the examples described herein are possible. For example, some of the methods described herein can be altered by changing the ordering of the method acts described, or by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g.. ROM, EEPROM, flash memory, etc.), or some combination of the two, accessible by the processing unit(s). The memory (120, 125) stores software (180) implementing one or more innovations for aggregating extraction results from different NER services, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) (also called computer-readable storage) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for aggregating extraction results from different NER services.

The input device(s) (150) may be a touch input device such as a keyboard, mouse, pen, or trackball, a voice input device, touchscreen for receiving gesture input, a scanning device, or another device that provides input to the computing system (100). The output device(s) (160) may be a display (e.g., touchscreen), printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions (also called machine-readable instructions), such as those included in program modules (also called computer program product), being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions tier program modules may be executed within a local or distributed computing system.

The terms "system" and "device" are used interchangeably herein, Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit specially designed or configured to implement any of the disclosed methods (e.g., an ASIC such as an AMC digital signal process unit, a graphics processing unit, or a programmable logic device such as a field programmable gate array).

For the sake of presentation, the detailed description uses terms like "determine," "provide" and "use" to describe computer operations in a computing system. These terms are high-level abstractions for operations performed by a computer, and should not be confused with acts performed by a human being. The actual computer operations corresponding to these terms vary depending on implementation.

II. Example NER Service Combination Architecture.

Figure 2:
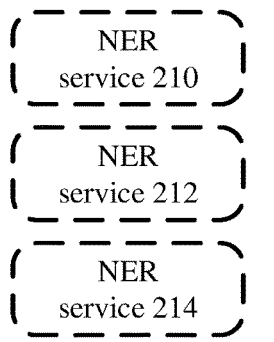
FIG. 2 is a diagram showing an example service combination architecture for aggregating extraction results.
Figure 2:
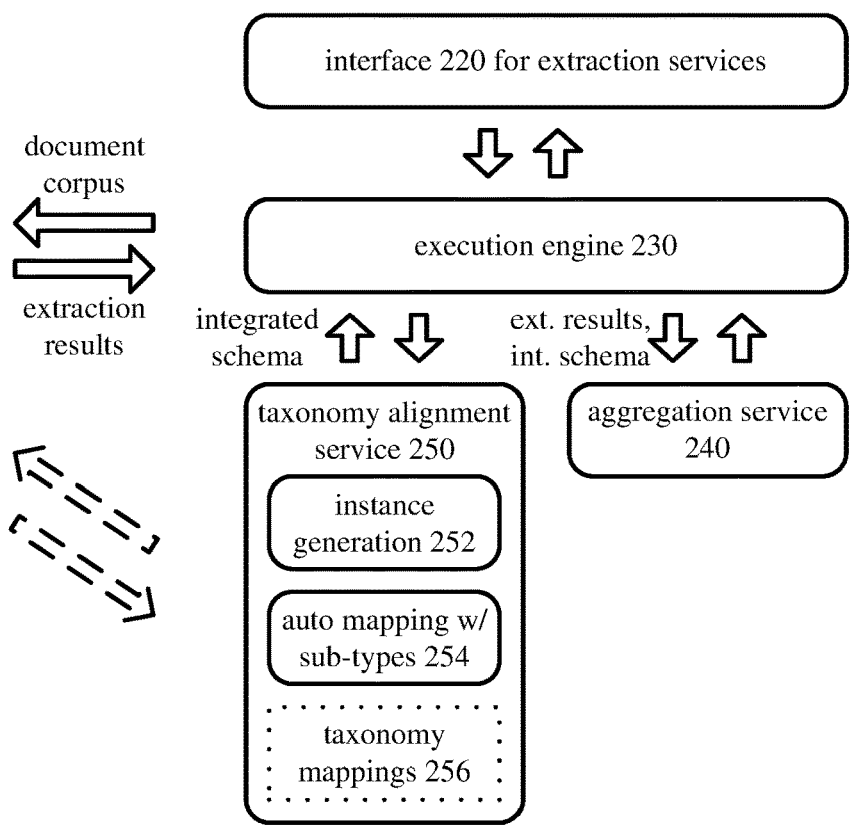

FIG. 2 shows an example service combination architecture (200) for combining extraction results from diverse NER services. The architecture includes multiple NER services (210, 212, 214), an interface (220) for extraction services, an execution engine (230) and an aggregation service (240). The architecture (200) can be implemented in any type of computing system with sufficient processing power.

In general, a NER service is any service that processes a document to detect an entity within content of the document, identify the location of the entity in the document, and classify the entity as having an entity type. The NER services (210, 212, 214) can include publicly available text mining services on the World Wide Web, such as AlchemyAPI, Digmap, Extractiv, FISE, Open-Calais and Wikimeta. The NER services (210, 212, 214) can also include proprietary text mining services employed by companies or other institutions. Although FIG. 2 shows three NER services (210, 212, 214), the architecture (200) can include more or fewer NER services. For text processing, the architecture (200) can include a pre-processor that converts text to a simple, unstructured format, before the text is provided to the NER services (210, 212, 214).

A user or external application interacts with the aggregation service through the interface (220). The interface (220) can be a graphical user interface, application programming interface ("API") or other form of interface. Through the interface (220), the user or external application specifies parameters of an extraction task (e.g., find persons in specified documents, find organizations in specified documents). Results of the aggregation process are provided through the interface (220) for inspection by the user or external application. The interface (220) passes the parameters for the extraction task to the execution engine (230), and receives the extraction results from the execution engine (230).

The execution engine (230) calls the NER services (210, 212, 214), providing the documents specified for the extraction tasks. For these documents (document corpus), each of the NER services (210, 212, 214) provides extraction results to the execution engine (230). The extraction results for one of the NER services (210, 212, 214) include entity annotations for the documents, which may be determined using a service-specific entity type schema. The service-specific entity type schema can be any structured organization of entity types that is supported by the NER service.

The execution engine (230) also calls a taxonomy alignment service (250), which returns taxonomy mappings and/or a standardized schema. The taxonomy alignment service (250) includes components for instance generation (252) and auto mapping with sub-types (254), as well as details of taxonomy mappings (256). The taxonomy alignment service (250) calls the components for instance generation (252) and auto mapping with sub-types (254) if no mappings/standardized schema have been previously calculated for the set of NER services (210, 212, 214) and their respective service-specific entity type schemas. After the first calculation of the mappings/standardized schema, the taxonomy alignment service (250) can regularly check for updates within the underlying taxonomies (for the service-specific entity type schemas) and calculate the mappings for new taxonomies for new services. Also, when used in combination with the execution engine (230), the taxonomy alignment service (250) can check if the types occurring within the extraction results are all included within the standardized schema. If not, the taxonomy alignment service (250) can invoke the instance generation (232) and auto-mapping (254) components to integrate any new types. For additional details about the operation of the taxonomy alignment service (250), see Pfeifer et al., "Mapping Text Mining Taxonomies," in *Proc.* *Of KDIR*, pages 5-16 (2013). Alternatively, the execution engine (230) uses manually created mappings instead of the automatically generated ones.

The aggregation service (240) receives the extraction results from the execution engine (230) across an interface (not shown) between the execution engine (230) and the aggregation service (240). Alternatively, the aggregation service (240) receives the extraction results directly from the NER services (210, 212, 214), across an interface with the NER services (210, 212, 214). The aggregation service (240) also receives the mapped entity type schemas (from the taxonomy mappings (256)), parameters specifying the extraction task, and other metadata as input. These can be received across the interface with the execution engine (230) or across different interfaces.

The aggregation service (240) aggregates the extraction results using one of the approaches detailed below. The aggregation service (240) returns the merged results (with traceability information) to the execution engine (230), which conveys the merged results through the interface (220) to the user or external application. The traceability information. supports tracing the aggregated results back to the underlying extraction results, and thereby facilitates manual rating of the reliability of annotations by the user.

The aggregation service (240) can be used during a training process that improves the quality of aggregation. Alternatively, the aggregation service (240) can be used without using the training process.

Alternatively, the architecture (200) includes more or fewer layers. For example, a given layer can be split into multiple layers, or different layers can be combined into a single layer. Functionality described with reference to one layer can in some cases be implemented in part or entirely in another layer. For example, the aggregation service (240) can be implemented in part or entirely in the execution engine (230). The aggregation service (240) and/or execution engine (230) can be implemented as part of a cloud-based computing system, or they can be implemented using a single, local computing system.

III. Example Aggregation Services and Process Flows.

Figure 3:
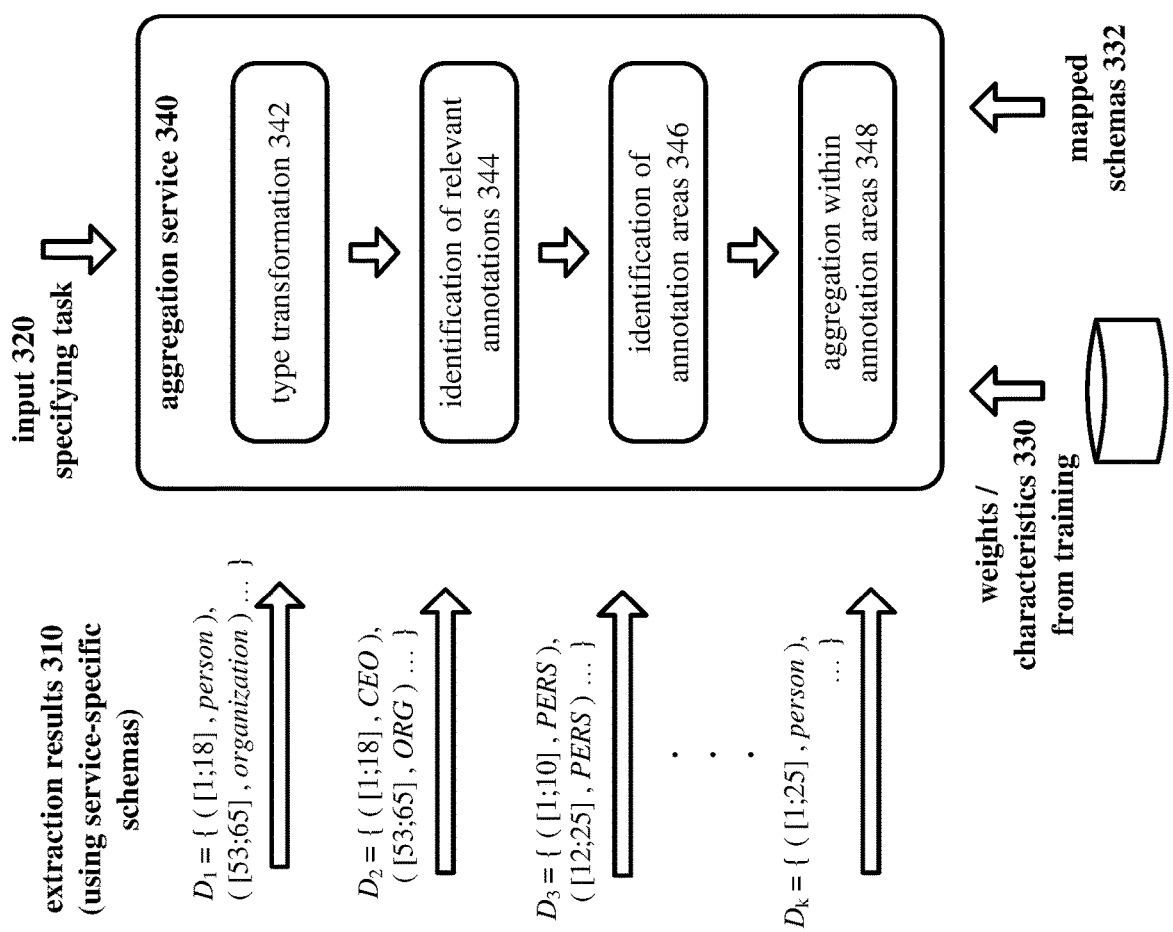
FIG. 3 is a diagram showing an example aggregation service architecture for aggregating extraction results.
Figure 4A:
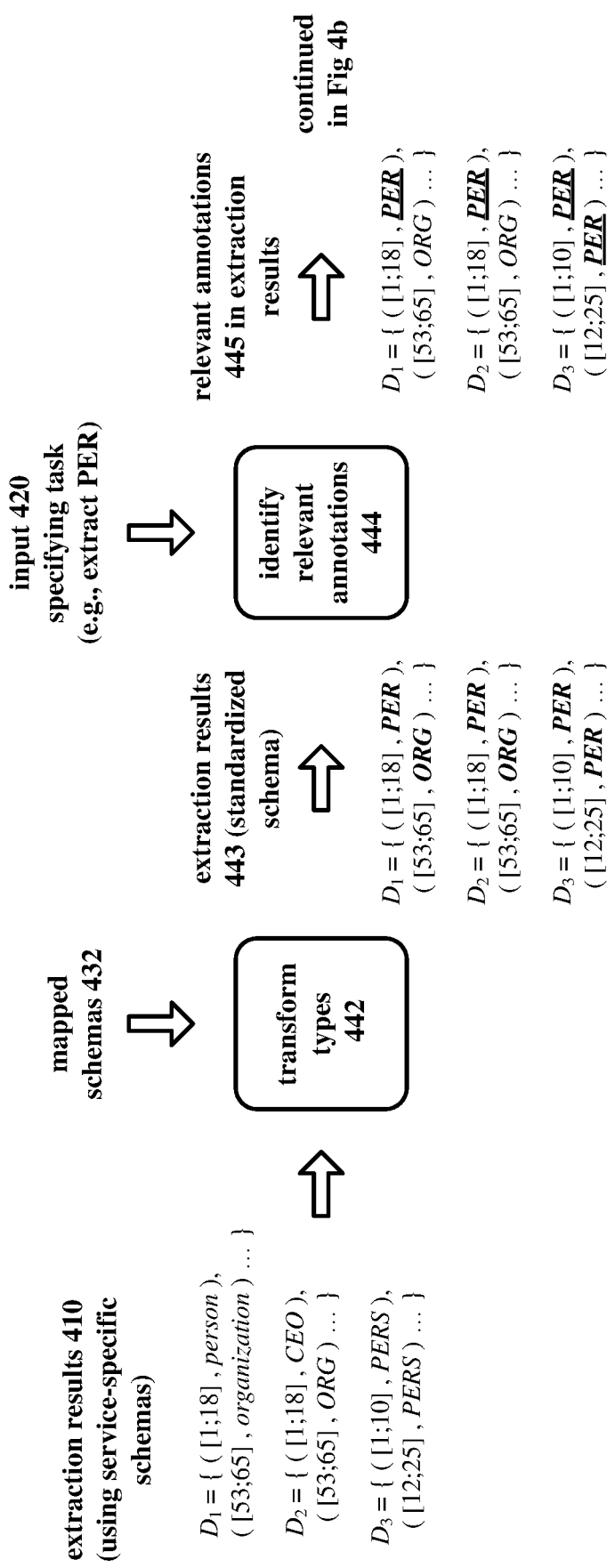
FIGS. 4a and 4b show process flow for the example aggregation service architecture of FIG. 3.
Figure 4B:
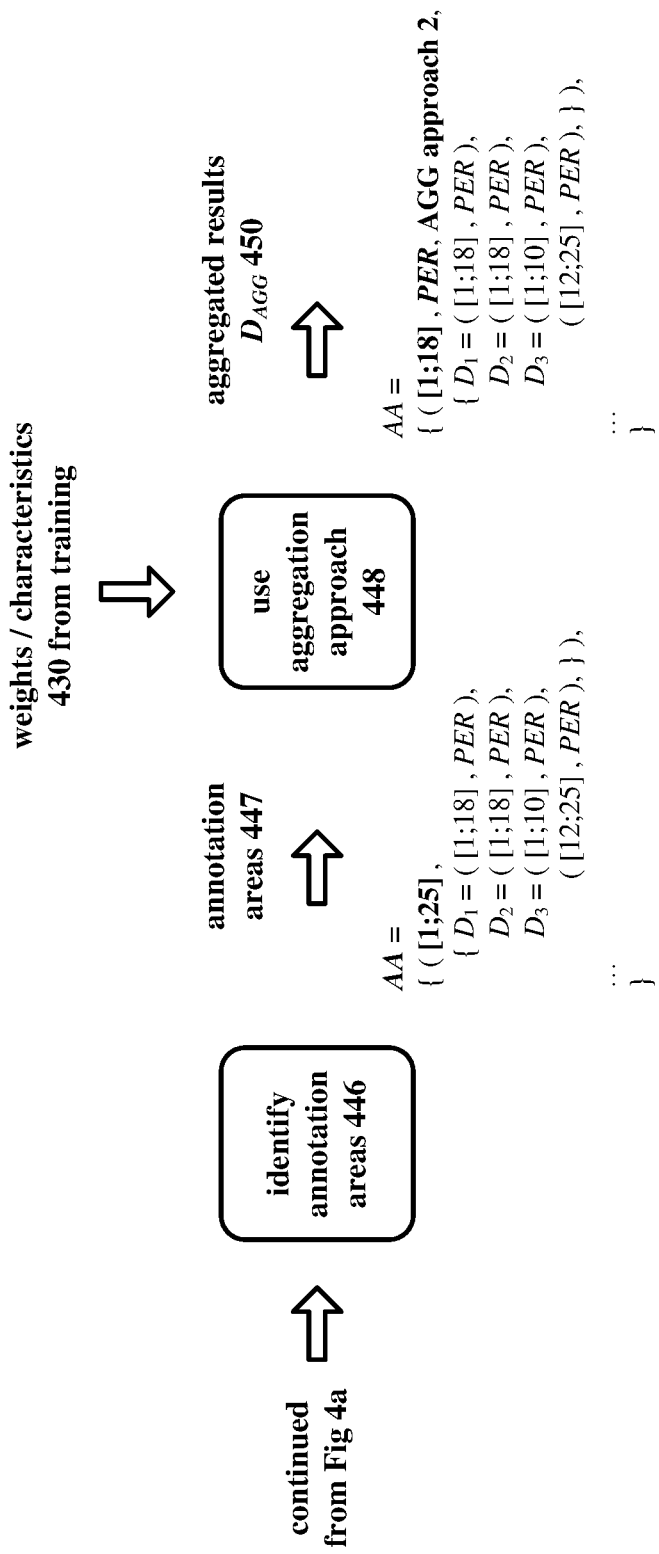

FIG. 3 shows an example aggregation service architecture (300) that includes an aggregation service (340). The aggregation service (340) can combine extraction results from K heterogeneous NER services using an aggregation approach. The architecture (300) can be implemented in any type of computing system with sufficient processing power. FIGS. 4a and 4b further detail the process flow for extraction results shown in FIG. 3.

The aggregation service (340) receives input (320) defining an extraction task (e.g., identify all persons in extraction results for document corpus D, identify all organizations in extraction results for document corpus D, identify annotations of some other entity type in extraction results for document corpus D, identify the most common entity type in extraction results for document corpus D). The extraction task is basically a query for the aggregation service (340) to execute.

The aggregation service (340) also receives extraction results (310) for the K NER services. The extraction results (310) include entity annotations $D_1, D_2, \ldots D_K$ for the K NER services, respectively, applied to the document corpus D. In FIGS. 3 and 4a, the entity annotations for the document corpus D include a list of entity locations and entity classifications. For example, the entity location [1;18] indicates the start (position 1) and end (position 18) of an entity in a document. Alternatively, entity locations are formatted in some other way (e.g., starting position and length). The entity classifications depend on the entity type schema used by the NER service (e.g., person, organization, etc. in $D_1$ for the first NER service).

As output, the aggregation service (340) produces aggregated results (350), including a set of annotations $D_{AGG}$ for the document corpus D, given the specific task. In FIG. 3, the aggregated results (350) include hypotheses evaluated by the aggregation service (340) and corresponding rankings for the hypotheses. Typically, the hypothesis with the highest ranking in a group is the most promising result, and is returned as part of the aggregated results (350), whereas other hypotheses are not returned as part of the aggregated results (350). Alternatively, the aggregated results follow another format. In FIG. 3, the hypotheses are grouped by annotation area of the document corpus D. The top hypotheses per annotation area (that is, ([1;18], PER) for the first annotation area and ([53;65], ORG for the second annotation area) are returned in the aggregated results (350).

In order to aggregate the entity annotations, the aggregation service (340) also receives information about the mapped schemas (332), such as the entity type schemas used by the NER services and mappings between entity types for different schemas. Different NER services may represent the same entity with different type names, and different NER services may use schemas with different granularity. The information about the mapped schemas (332) can be retrieved from components of an execution engine, as described with reference to FIG. 2, and generally provides a global ontology of entity types for use in aggregating extraction results. Alternatively, the information about the mapped schemas (332) is created in some other way.

A. Training the Aggregation Service.

In example implementations, a document corpus is available for training purposes. This training corpus is a set of documents with correct named entity annotations. The aggregation service (340) can use the training corpus to learn characteristics of the K NER services, in order to calibrate the aggregation service (340). For example, the training corpus is split into an evaluation corpus and testing corpus. The evaluation corpus is used to evaluate the performance of the NER services, by identifying discrepancies between extraction results for the NER services and extraction results known to be correct in the evaluation corpus, and to calibrate aggregation approaches. The testing corpus is used to evaluate the aggregation operator and choose the correct aggregation operator for the training data. The result of the training process is weight values or other information about performance characteristics (330) for the NER services, which can be used in subsequent aggregation, In example implementations, the performance characteristics can account for errors in detection, identification or classification of specific entity types for a given NER service.

If a training corpus is not available, or if it does not reflect correct entity type annotations, the aggregation service (340) does not use certain aggregation approaches. In particular, in this case, the aggregation service (340) does not use aggregation approaches that consider weight values or other information about performance characteristics for the NER services.

Since the performance of NER services can vary for different categories of documents, the aggregation service (340) can train different models for different categories of content (e.g., a model for aggregation of extraction results for message services, a model for aggregation of extraction results for blog posts, a model for aggregation of extraction results for Web pages). Weight values/performance characteristics (330) for an appropriate model are then applied for aggregation.

B. Aggregation of Extraction Results Using the Aggregation Service.

in general, when aggregating extraction results from diverse NER services, the aggregation service (340) applies a series of transformations, summarization operations and ranking operations. For a document corpus D for which correct entity annotations are unknown, the aggregation service (340) attempts to identify correct entity annotations for the specified extraction task. The aggregation service (340) uses extraction results from the NER services, which may include overlapping entity locations and mismatched entity type classifications. In some cases, the aggregation service also uses information about performance characteristics (330) of the NER services.

The aggregation service (340) uses type transformation (342) to transform entity types in the extraction results (310) from service-specific entity type schemas (e.g., with different entity type taxonomies) to standardized entity types. For this transformation, the aggregation service uses information about the mapped schemas (332). For each entity type of an annotation in the extraction results (according to a service-specific entity type schema), a standardized entity type that is equal to the original entity type, or the next broader entity type, is selected and assigned to the annotation.

in FIG. 4a, the extraction results (410) from NER services (using service-specific entity type schemas) and mapped schemas (432) are provided to a module of the aggregation service that transforms types (442). After the type transformation, the extraction results (443) have entity types according to a standardized entity type schema. For example, the entity type person in the entity annotations $D_1$ is transformed to the standardized type PER, which is equal to person. In the entity annotations $D_2$, the entity type CEO is transformed to the next broader entity type in the standardized schema PER. Similarly, the organization entity type in the entity annotations $D_1$ is transformed to the standardized entity type ORG. In FIG. 4a, changes to entity types are shown in boldface type in the extraction results (443).

Returning to FIG. 3, the aggregation service (340) next uses identification of relevant annotations (344) to identify and mark relevant annotations in the extraction results from the NER services. What qualifies as a relevant annotation depends on the specified task. In general, relevant annotations are those for which the entity type of the annotation has any relation to the entity type(s) defined in the task (e.g., by being an equal, narrower or broader type). If the entity type of an annotation (now in the standardized entity type schema) is narrower than the entity type specified for the task, the aggregation service (340) can replace the entity type with the broader type specified for the task. For example, if the task is to find locations and the entity type of an annotation is city, the city annotation is replaced by a location annotation. As another example, if the task is to find PERs, and the entity type of the annotation (in the standardized schema) were CEO, the CEO annotation would be replaced by a PER annotation at this stage. Entity annotations that are not marked as being relevant can still be kept as metadata, and may be useful in aggregation processes.

In FIG. 4a, the extraction results (443) according to the standardized entity type schema and input (420) specifying a task are provided to a module of the aggregation service that identifies relevant annotations (444). This module produces relevant annotations (445) in extraction results. For example, if the task is to extract PERs, the entity annotations PER are identified and marked as relevant in the extraction results. Other entity types (e.g., ORG) are not marked as relevant. In FIG. 4a, entity types for relevant annotations are shown in underlined, boldface type in the relevant annotations (445).

Returning to FIG. 3, the aggregation service (340) next identifies one or more annotation areas (346) for the document corpus D. In general, an annotation area is an area (e.g., text area) with precise starting and ending positions, within which one or more of the NER services annotated something in a document. Each position within an annotation area is covered at least by one annotation of one of the NER services. For example, an annotation area can include an annotation from each of three different NER services, where the annotations can be completely overlapping (same location of annotation in document) or partially overlapping. Annotations marked as relevant are considered when identifying annotation areas. An annotation area designates a possible area of one or several named entities in the aggregated results. For example, suppose a first NER service returns extraction results with annotations $D_1=\{([1;6], LOC), ([10;19], PER), ([20;27], PER), \ldots\}$, and a second NER service returns extraction results with annotations $D_2=\{([13;27], PER), \ldots\}$. The aggregation service identifies two annotation areas. A first annotation area is at area [1;6], since the first NER service annotated something in this area. A second annotation area is at area [10, 27], since the first and second NER services each annotated something in this area. The area [1;27] is not an annotation area, since not all of the area is covered by an annotation (specifically, area [7;9] is not covered by any annotation).

In FIG. 4b, the extraction results with relevant annotations (445) (from FIG. 4a) are provided to a module of the aggregation service that identifies annotation areas (446). This module (446) produces a list of annotation areas (447). For example, the list of annotation areas AA includes an annotation area at the location [1; 25] in the document corpus D. The entity annotations in the annotation area [1; 25] are also listed, as shown in FIG. 4b. Alternatively, the annotation areas use another format. In FIG. 4b, the location of an annotation area is shown in boldface type in the annotation areas (447).

Returning to FIG. 3, the aggregation service (340) next aggregates entity type annotations within the annotation areas (348), respectively. For example, for each annotation area, the aggregation service (340) applies an aggregation approach that merges the entity type annotations in the extraction results for that annotation area. Given the extraction task (320), the aggregation service (340) attempts to determine an entity in the annotation area (detection), identify correct entity boundaries (identification) and assign the entity type that fits best (classification). Typically, the aggregation service (340) identifies a set of hypotheses for the annotations in an annotation area and ranks the hypotheses according to the aggregation approach. The hypothesis with the highest rank R is accepted as part of the aggregated results, as shown in FIG. 3, and the remaining hypotheses are not included in the aggregated results. Alternatively, any hypothesis with a rank above a threshold amount is accepted. For a given annotation area, the aggregated results can include no entity annotations, a single entity annotation, or multiple entity annotations. Example aggregation approaches are detailed below. In some cases, the aggregation approaches use weights or other performance characteristics (330) determined during training. The aggregation service (340) outputs the aggregated results (350). Depending on implementation, confidence values (e.g., based on rank values) can also be assigned and output for the aggregated results.

In FIG. 4b, the list of annotation areas (447) with entity type annotations are provided to a module of the aggregation service that uses an aggregation approach (448). This module produces aggregated results $D_{AGG}$ (450). For example, within the annotation area at [1;25] of the document corpus D, the aggregation service evaluates the entity type annotations and identifies the entity type annotation PER at location [1;18] as being the most promising. In the aggregated results (450), the aggregation service specifies the most promising entity annotation(s). The aggregation service can also specify the aggregation approach used and other entity annotations in the extraction results from the NER service. In FIG. 4b, the most promising entity annotation is shown in boldface type in the aggregated results $D_{AGG}$ (450).

IV. Example Techniques for Aggregation and Training.

Figure 5:
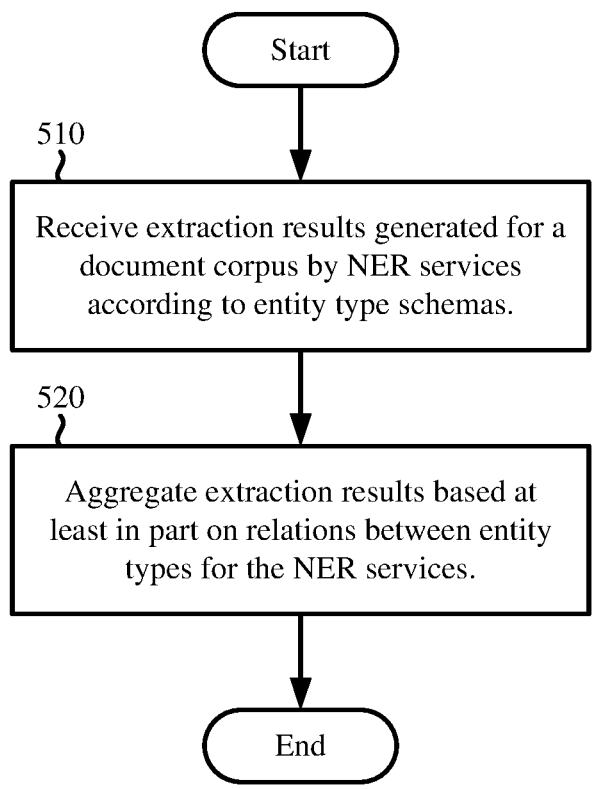
FIG. 5 is a flowchart showing a generalized technique for aggregating extraction results of diverse NER services.

FIG. 5 shows a generalized technique (500) for aggregating extraction results from diverse NER services. An aggregation service implemented in a computing system performs the technique (500).

To start, the aggregation service receives (510), for each of multiple different NER services, extraction results generated for a document corpus according to an entity type schema. For example, the document corpus includes one or more documents with text (e.g., Web pages, articles, invoices, emails, white papers, bldg posts, news feeds or other objects containing text information). Alternatively, the document corpus includes other types of documents. The entity type schema applied by a NER service can be specific to the NER service, or several of the NER services can use the same entity type schema. In general, the extraction results for each of the multiple NER services include entity annotations for the document corpus. The extraction results can be received directly from the NER services or through an intermediary (e.g., execution engine for service combination system).

The aggregation service aggregates (520) the extraction results based at east in part on relations between entity types for the multiple different NER services. For example, the aggregation service considers differences in entity type schemas when aggregating the extraction results from the NER services, accounting for differences in the entity types supported and the relations between the entity types in different entity type schemas. Depending on implementation, the aggregation (520) can include one or more of the following stages: (1) type transformation; (2) identification of relevant annotations; (3) identification of annotation areas; and (4) aggregation. Alternatively, the aggregation (520) includes other and/or additional stages.

For the type transformation, for example, the aggregation service can process the extraction results for a given NER service of the NER services as follows. For each of multiple annotations in the extraction results, the aggregation service transforms the entity type of the annotation from the entity type schema of the NER service to a standardized entity type schema. This can include, for the entity type of the annotation, selecting a type from the standardized entity type schema that is equal to or broader than the entity type of the annotation, and assigning the selected type to the annotation. Alternatively, the aggregation service performs the type transformation in some other way.

For the identification of relevant annotations, for example, the aggregation service can process the extraction results for a given NER service of the NER services as follows. The aggregation service identifies one or more relevant annotations among multiple annotations in the extraction results, and marks the relevant annotation(s) in the extraction results. The relevance of a given annotation can depend on relation between the entity type for the given annotation and the entity type specified for a task (e.g., if its entity type is equal to, narrower than or broader than the entity type specified for the task, the given annotation is relevant; otherwise, the given annotation is not relevant). In some implementations, if the entity type specified for the task is broader than the entity type for the given annotation, the aggregation service replaces the entity type for the given annotation with the entity type specified for the task. Alternatively, the aggregation service performs the identification of relevant annotations in some other way.

For the identification of annotation areas, for example, the aggregation service can process the extraction results as follows. The aggregation service identifies one or more annotation areas in a document of the document corpus, where an annotation area includes one or more annotations in the extraction results for the NER services. A given annotation area can include overlapping annotations from the extraction results of two or more of the NER services. Alternatively, the aggregation service performs the identification of annotation areas in some other way.

For the aggregation of extraction results, for example, the aggregation service can use an aggregation approach to identify an aggregated set of annotations for the extraction results for at least some of the NER services. In general, for a given annotation area in a document of the document corpus, the aggregation service identifies a set of one or more hypotheses and ranks the one or more hypotheses according to the aggregation approach. The aggregation approach can include: (a) extended majority vote analysis (ranking each of one or more hypotheses based at least in part on type consistency and region consistency in the extraction results for the NER services), (b) weighted majority vote analysis (ranking each of one or more hypotheses based at least in part on type consistency and region consistency in the extraction results for the NER services, and based at least in part on weight values for the NER services, respectively), (c) simple error path analysis (ranking each of one or more hypotheses based at least in part on estimates of likelihood of error paths in extraction results for the NER services when compared individually to extraction results known to be correct), (d) pairwise error path analysis (ranking each of one or more hypotheses based at least in part on estimates of likelihood of error paths in extraction results for the NER services when compared on a pairwise basis to extraction results known to be correct), and/or (e) another approach.

In some cases, an aggregation approach uses weight values and/or error path values for the NER services, respectively, where the weight values and/or error path values have been determined during training. The aggregation service can use different weight values and/or error path values for different categories of document corpus. Alternatively, the aggregation approach uses other performance characteristics of the NER services.

Figure 6:
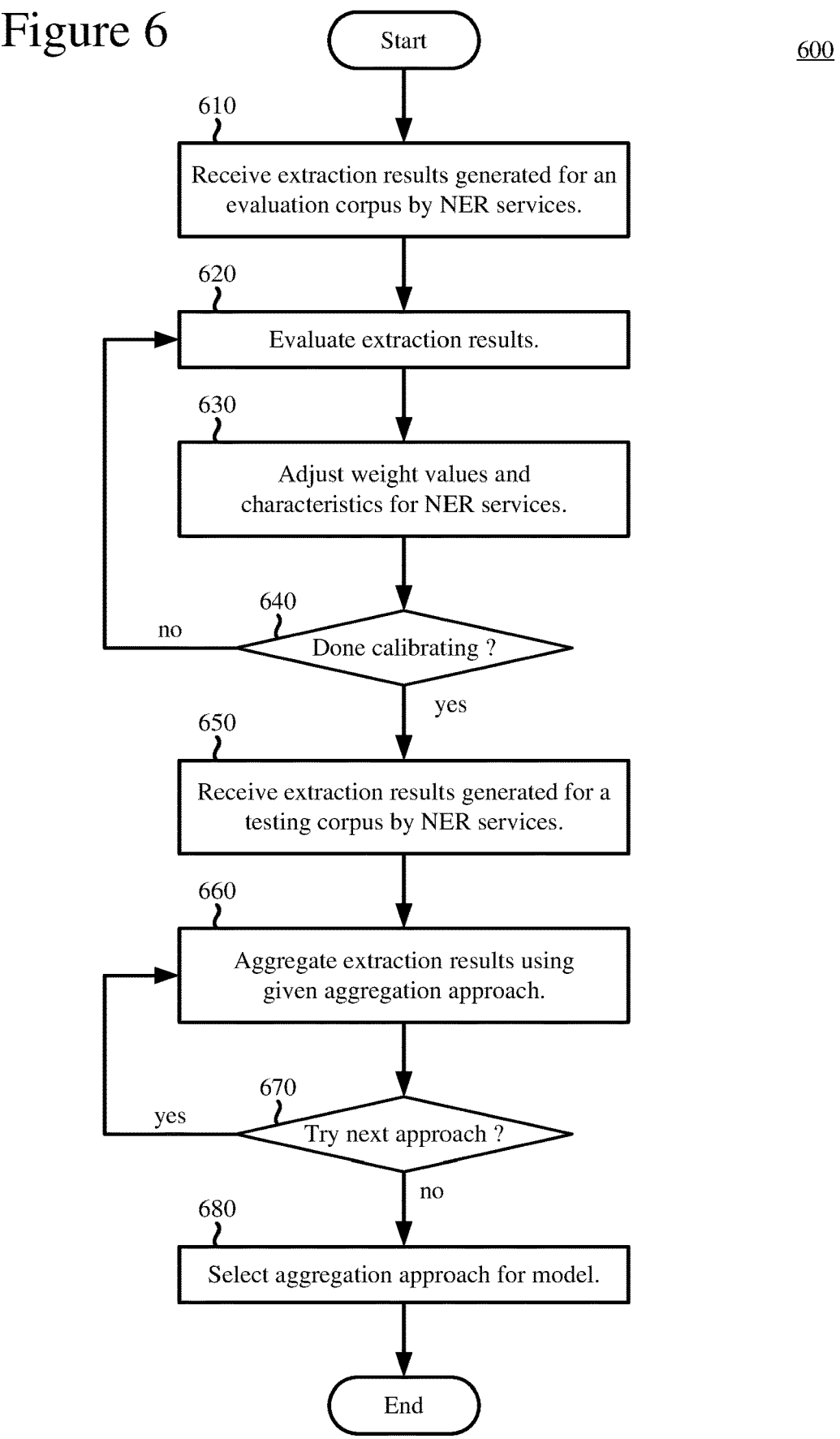
FIG. 6 is a flowchart showing an example technique for training an aggregation service.

FIG. 6 shows an example technique (600) for training an aggregation service. An aggregation service implemented in a computing system performs the technique (600). The technique (600) includes two stages.

In the first stage, the aggregation service evaluates the NER services and calibrates weight values or other performance characteristics used in aggregation. For example, the weight values or other performance characteristics are based on probabilities of error paths in transformations from extraction results that are known to be correct to extraction results from the NER services. The aggregation service receives (610) extraction results generated for an evaluation corpus by NER services. The evaluation corpus can include one or more documents of a training corpus. The aggregation service evaluates (620) the extraction results. The aggregation service adjusts (630) the weight values or other performance characteristics for NER services based on the extraction results and decides (640) whether it is done calibrating. If not (e.g., where there are remaining documents of the evaluation corpus to be evaluated, for an evaluation corpus split into smaller sets of documents), the aggregation service evaluates (620) the extraction results for remaining documents of the evaluation corpus.

When done calibrating, the aggregation service proceeds to the second stage. In the second stage, the aggregation service determines which aggregation approach to use for the training corpus. The aggregation service receives (650) extraction results generated for a testing corpus by NER services. The testing corpus can include the rest of the documents of the training corpus (that is, documents not in the evaluation corpus). The aggregation service aggregates (660) the extraction results using a given aggregation approach, then decides (670) whether to continue with the next aggregation approach. After it has evaluated all of the aggregation approaches, the aggregation service selects (680) an aggregation approach to use for the category of training corpus that was evaluated.

The aggregation service can repeat the technique (600) for different categories of document corpus (e.g., Web pages, blog posts, news feeds).

Figure 7:
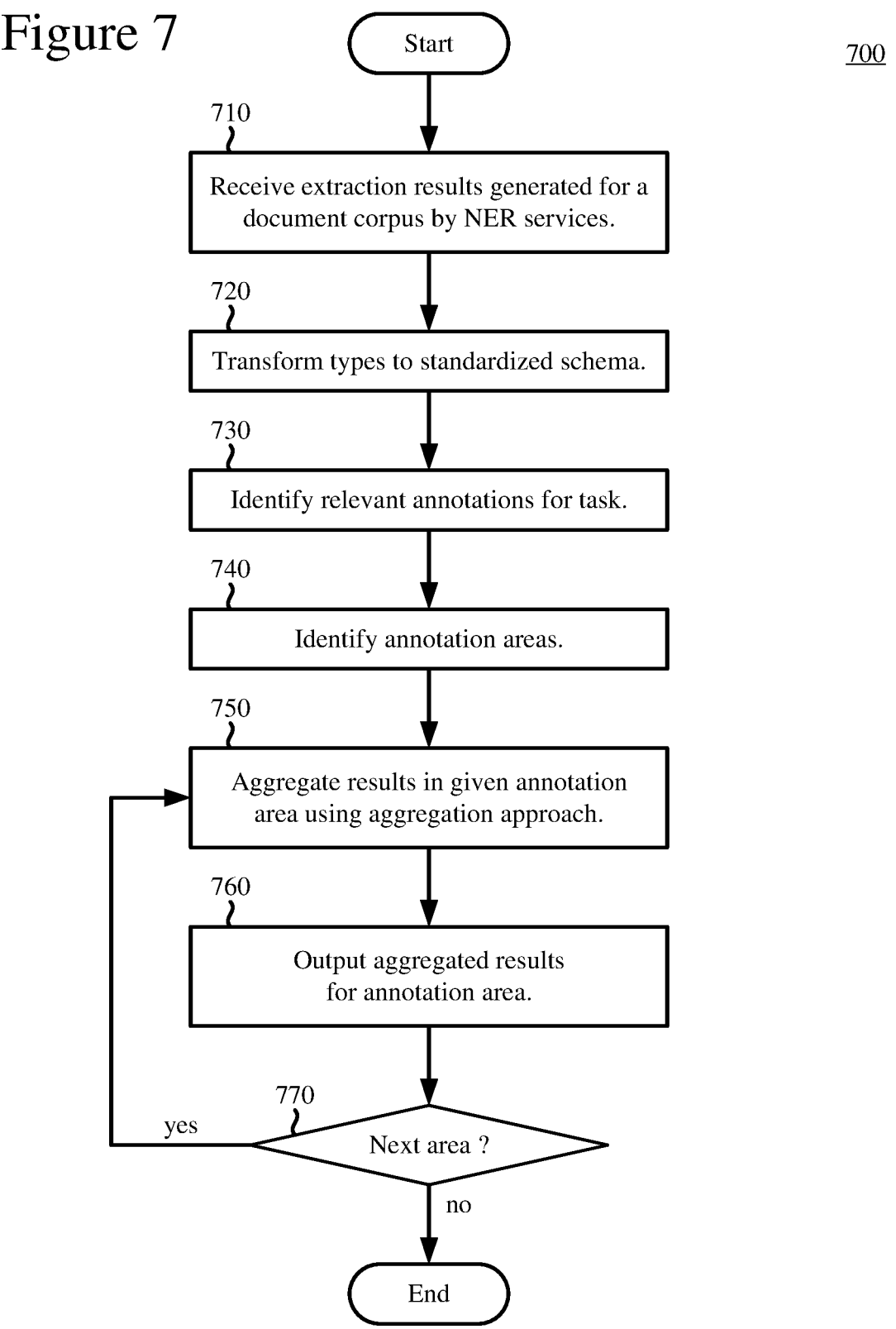
FIG. 7 is a flowchart showing an example technique for aggregating extraction results of diverse NER services using a selected aggregation approach.

FIG. 7 shows an example technique (700) for aggregating extraction results of diverse NER services using a selected aggregation approach. An aggregation service implemented in a computing system performs the technique (700).

To start, the aggregation service receives (710), for each of multiple different NER services, extraction results generated for a document corpus. For example, the document corpus includes one or more documents with text (e.g., Web pages, articles, invoices, emails, white papers, blog posts, news feeds or other objects containing text information). Alternatively, the document corpus includes other types of documents. The aggregation service aggregates the extraction results, transforming (720) entity types to a standardized entity type schema, identifying (730) relevant annotations for a given task in the extraction results, and identifying (740) one or more annotation areas. Then, for each of the annotation area(s), the aggregation service aggregates (750) relevant annotations in the annotation area using an aggregation approach. For example, the aggregation approach can be one of the aggregation approaches described in the next section, which is selected by the aggregation service (as in decision (680) in FIG. 6), and may depend on category of the document corpus. The encoder outputs (760) the aggregated results for the annotation area and decides (770) whether to continue with the next annotation area. If so, the aggregation service aggregates (750) relevant annotations for the next annotation area.

V. Example Aggregation Approaches.

The aggregation service can use any of several aggregation approaches when aggregating extraction results from diverse NER services. For a given extraction task, an aggregation approach determines the existence of entities in a document corpus, deter boundaries of the entities in the document corpus, and assigns entity types. Example approaches include:

extended majority vote, which uses a majority vote process that considers entity types and their relations;

weighted majority vote, which uses a majority vote process that considers entity types and their relations, with weighting based on individual performance of the respective NER services;

simple error path ("SEP"), which uses an error-driven process that considers error patterns service-wise and on a per entity type basis; and pairwise error path ("PEP"), which uses an error-driven process that considers error patterns between pairs of NER services and on a per entity type basis.

A. Operations and Terminology.

The aggregation approaches described in this section share certain operations and terminology.

An annotation area x is marked by the overlapping output $D_x$ of the K base NER services, where $D_x = D_{1x} \cup D_{2x} \cup \ldots \cup D_{Kx}$. Based on the overlapping output $D_x$ of the area x, the aggregation service constructs a hypothesis space $\Omega_x$ for the area x. This hypotheses space $\Omega_x$ includes one or more hypotheses $H_{jx}$ for possible aggregated results tier the area x. The aggregation service constructs the hypotheses space $\Omega_x$ from $D_x$ by adding each unique annotation/annotation set made by one of the K base NER services. Additionally, the aggregation service adds the null hypothesis (stating that there is no annotation within the annotation area) to the hypothesis space $\Omega_x$ for the area x.

The aggregation service assigns a ranking value $R(H_{jx}|D_x)$ to each hypothesis $H_{jx}$ in the hypothesis space $\Omega_x$. In general, the ranking value is an estimation that is proportional to the likelihood $P(H_{jx}|D_x)$, that is, proportional to the conditional probability that the hypothesis $H_{jx}$ is true given the observed annotations $D_x$. Typically, the hypothesis with the highest rank is taken as aggregate for the specific annotation area x. Alternatively, multiple hypotheses can be accepted as aggregated results for the area x if they are above a threshold, or the aggregated result is selected in some other way. The way that ranking values are assigned depends on the aggregation approach that is used.

With the exception of the extended majority vote approach, the listed aggregation approaches use results of training with a training corpus.

Alternatively, the aggregation service uses other and/or additional aggregation approaches. In general, the aggregation approaches are interchangeable. The quality of aggregation can differ for a given document corpus, however, depending on the aggregation approach that is used. in some implementations, the aggregation service selects one of the aggregation approaches based on results of training.

For purposes of assigning ranking values during aggregation, an annotation $A_x$ is a single entity within an annotation area x that is characterized by its type $t(A_x)$ and its region $r(A_x)$, which corresponds to location of the annotation. An annotation set $AS_x$ is an accumulation of annotations with respect to an annotation area x. Empty annotation sets are explicitly allowed in order to specify cases where no annotation exists within an annotation area. The number of annotations of an annotation set is given by $|AS_x|$. Both a hypothesis $H_{jx}$ and a NER service output $D_{kx}$ are annotation sets.

Subtypes $st_1, \ldots, st_n$ of an entity type t are indicated by $st(t) = \{st_1, \ldots, st_n\}$. The subtypes $st_1, \ldots st_n$ comprise the entity types that are narrower than the type t. The narrowest type that includes the type t and is covered by the specific base NER service k is given by $et_k(t)$. For example, suppose a first entity type schema S1 includes the LOC entity type, and suppose a second entity type schema S2 includes the entity type location that has the two sub-types city and country. The following relationships apply.

S1.LOC=S2.location
st(S2.location)={S2.city, S2.country}
$et_{S1}$(S2.city)=S1.LOC
$et_{S2}$(S2.city)=S2.city The type of an annotation set $AS_x$ is determined by the contained annotations as follows, for $A_x^i$ in $AS_x$:

$$t(AS_x) = \begin{cases} \text{NULL} & \text{if } |AS_x| = 0 \\ t(A_x^1) & \text{if } |AS_x| = 1 \text{ or } t(A_x^1) = t(A_x^2) = \ldots = t(A_x^{|AS_x|}). \\ \text{MIX} & \text{else} \end{cases} \quad (1)$$

The consistency of the regions of two annotations $A_{nx}$ and $A_{mx}$ is specified by:

$$rc(A_{nx}, A_{mx}) = \begin{cases} 1 & \text{if } r(A_{nx}) = r(A_{mx}) \\ 0 & \text{if } r(A_{nx}) \neq r(A_{mx}) \end{cases}. \quad (2)$$

An annotation set $AS_{nx}$ (e.g., the NER service output $D_{kx}$) is region consistent with respect to another annotation set $AS_{mx}$ (e.g., a hypothesis $H_{jx}$) if both have the same number of annotations within the annotation area x, and if all those annotations form pairs of region-consistent annotations. That is, region-consistency between two annotation sets is indicated by:

$$rc(AS_{nx}, AS_{mx}) = \begin{cases} 1 & \text{if } |AS_{nx}| = |AS_{mx}| = 0 \\ \prod_{i=1}^{|AS_{nx}|} rc(A_{nx}^i, A_{mx}^i) & \text{if } |AS_{nx}| = |AS_{mx}| \neq 0 \\ 0 & \text{if } |AS_{nx}| \neq |AS_{mx}| \end{cases} \quad (3)$$

The specification of the consistency of entity types is more complex, since relationships between entity types and the varying type-coverage of NER services is considered. The type consistency of a given annotation $A_{nx}$ and annotation $A_{kx}$ in NER service output $D_{kx}$ is given by:

$$tc(A_{nx}, A_{kx}) = \begin{cases} 1 & \text{if } t(A_{nx}) = t(A_{kx}) \\ & \text{or } st_i = t(A_{kx}) \text{ for one } st_i \in st(t(A_{nx})) \text{ with } et_n(st_i) = t(A_{nx}) \\ & \text{or } et_k(t(A_{nx})) = t(A_{kx}) \\ 0 & \text{if } r(A_{nx}) \neq r(A_{kx}) \end{cases} \quad (4)$$

This means that the NER service annotation $A_{kx}$ has the same type as the given annotation $A_{nx}$ if: (1) the types are identical, (2) a subtype of the entity type of the given annotation $A_{nx}$ is the type of the NER service annotation $A_{kx}$, or (3) the NER service annotation $A_{kx}$ has a type that is broader than the type of the given annotation $A_{nx}$, but $t(A_{kx})$ is the narrowest type the NER service covers with respect to the type $t(A_{nx})$ of the annotation (e.g., the annotation $t(A_{nx})$ has the type city, but the $k^{th}$ NER service only covers the location type).

The type consistency between two annotation sets is specified as follows, which is analogous to how region consistency is specified:

$$tc(AS_{nx}, AS_{mx}) = \begin{cases} 1 & \text{if } |AS_{nx}| = |AS_{mx}| = 0 \\ \prod_{i=1}^{|AS_{nx}|} tc(A_{nx}^i, A_{mx}^i) & \text{if } |AS_{nx}| = |AS_{mx}| \neq 0 \\ 0 & \text{if } |AS_{nx}| \neq |AS_{mx}| \end{cases} \quad (5)$$

Aside from simply using entity type consistency and region consistency, the aggregation service can leverage the error patterns of NER services to improve aggregation. Mistakes made by a NER service are observable as discrepancies between the entities within the ground truth (G) and extraction results for the NER service. An extraction error can be seen as a transformation from the ground truth G to the NER service output ($D_k$) (e.g., part of the transformation can be removing an annotation, when the annotation has been missed by the NER service). A transformation from G to $D_k$ is represented as $\tau(G, D_k)$. Because G and $D_k$ can be very large, the transformation is broken down into several small transformations $\tau(G, D_k) \equiv \{\tau(G_i, D_{ki})\}$ that occur within annotation areas. All elementary transformations forming $\tau(G, D_k)$ are summarized by $T_k = \tau_i(G_i, D_{ki})$.

The transformation within an annotation area can be characterized in various ways. One possibility is to consider the number of entities of the ground truth (m) and of a specific $k^{th}$ base NER service (n). The transformation is denoted $\tau(G_i, D_{ki}) \equiv \tau^{m,n}$. The set of transformations is $T^C\{\tau^{m,n}: \text{for } m, n \geq 0, m+n > 0\}$. For practical purposes, the set of transformations is limited to $T^C = \{\tau^{0,1}, \tau^{1,0}, \tau^{1,1}, \tau^{1,2}, \tau^{2,1}\}$. Transformations with higher number of entities can be reduced to these basic transformations. The transformation $\tau^{1,0}$ represents a false negative (that is, in $D_k$ the $k^{th}$ NER service missed an annotation that appears in the ground truth G), and $\tau^{0,1}$ represents a false positive error (that is, the $k^{th}$ NER service incorrectly annotated something in $D_k$, which was not an annotation in the ground truth G). The transformation $\tau^{1,1}$ represents cases in which entity detection is correct in $D_k$, but other errors were made (e.g., wrong entity type classification, wrong entity location) In practice, most errors can be represented with transformations $\tau^{1,0}$, $\tau^{0,1}$ and $\tau^{1,1}$. The transformation $\tau^{1,2}$ represents an error in which there is one annotation in the ground truth G (e.g., John F. Kennedy International Airport is airport) but two possible annotations in $D_k$ (e.g., John is person, F. Kennedy is person), and the transformation $\tau^{2,1}$ represents an error in which there are two annotations in the ground truth G but only one annotation in $D_k$.

Another possibility is to consider the types of the annotations occurring within the annotation area: $t(G_i)$ for the ground truth and $t(D_{ki})$ for the $k^{th}$ base NER service. In this case, the transformation set is $T^t = \{\tau^{(G_i)t(D_{ki})}\}$, e.g., $T^t = \{\tau^{(NULL,ORG)}, \tau^{(ORG,NULL)}, \ldots\}$. In order to summarize certain transformation cases, the negation (!) excludes an entity type, and the star pattern (*) matches every type. In some implementations, the transformations are $T^t = \{\tau^{(NULL,t)}, \tau^{(t,NULL)}, \tau^{(!t,t)}\}$ for each entity type t occurring within the training corpus.

Independent of the specific transformation space used, errors are merged in an error space E that covers an abstraction of all possible errors (e.g., wrong region, wrong type). Three possible error spaces are:

($E_1$) $e_t$="typeerror"
($E_2$) $e_t$="typeerror" and $e_r$="region error"
($E_3$) $e_{t,ty}$="typeerror, ty as false type" and $e_r$="region error"

$E_1$ only considers type errors and ignores region errors (e.g., if only the classification might be important). $E_2$ represents the case where region errors and type errors are considered. $E_3$ is similar to $E_2$, but considers the entity types used in incorrect classification. More enhanced error spaces are possible if the amount of training data allows it (e.g., accounting for entity type classifications that are too general).

The state of each error or error class (if several errors are summarized) is binary:

$$s_{\tau_i}(e_x) = \begin{cases} 1 & \text{if } e_x \text{ occurs within } \tau_i \\ 0 & \text{otherwise} \end{cases} \quad (6)$$

$$s_{\tau_i}(E) = \{s_{\tau_i}(e_x)\}, e_x \in E, \tau_i \in T_i. \quad (7)$$

The occurrence of an error can be evaluated with the help of the functions for region and type correctness.

The aggregation service also uses indicator functions and $I_{\tau_i}(\tau^{m,n})$ and $ts_{D,\tau_i}(t)$. The indicator function $I_{\tau_i}(\tau^{m,n})$ marks if a given transformation $\tau^{m,n} \in T$ is of type $\tau_i$ or not. The indicator function $ts_{D,\tau_i}(t)$ marks if the NER service output of transformation $\tau_i$ is of type t.

$$I_{\tau_i}(\tau^{m,n}) = \begin{cases} 1 & \text{if } \tau_i \text{ is of type } \tau^{m,n} \\ 0 & \text{otherwise} \end{cases} \quad (8)$$

$$ts_{D,\tau_i}(t_k) = \begin{cases} 1 & \text{if } t(D_{ki}) = t_k \text{ within } \tau_i \\ 0 & \text{otherwise} \end{cases} \quad (9)$$

The formula for the indicate function $I_{\tau_i}(\tau_{m,n})$ can also be used for transformations within the transformation space $T_t$.

B. Voting Approaches.

One way to combine annotations from different extraction results is a simple majority vote. The simple majority vote can consider detected entities and locations of entities.

In other voting approaches, in addition to detected entities and their borders, entity types are considered. The following example gives annotations within an annotation area for the extraction results from three NER services Ex1, Ex2 and Ex3.

Ex 1: ([178; 187], Vancouver, city)
Ex2: ( )
Ex3: ([178; 187], Vancouver, location)

In this example, there are three possibilities: 1. an annotation with type city; 2. an annotation with type location; and 3. no annotation). A simple majority vote will be undecided, since all three possibilities occur once and thus have the same likelihood (about 33%).

In contrast, an extended majority vote approach can consider entity type hierarchies and supported entity types. By incorporating entity type schema information into the aggregation process, the aggregation service can differentiate more precisely between the three possibilities. Suppose the mapped entity type schemas indicate that all NER services have the ability to extract locations, but that only one of them (Ex1) can identify cities. Considering that all cities are locations, the annotation with the entity type location becomes more likely (about 67%).

Also, to determine the likelihood of the city annotation, the NER services that cover the type city or the type location can be considered, where extraction results that do not contradict an annotation of type city are counted as positive (e.g., if the NER service Ex3 supports the entity type of location with sub-types mountain and river, location is counted as positive, but river and mountain are not). For the example presented above, if location is counted as a positive result, the likelihood for the city annotation is about 67% (two annotations for, one annotation against). Using the extended majority vote approach may result in the same likelihood for an entity type and one of its sub-types. In this case, the narrower type (e.g., city) can be accepted as the aggregated result.

Formally, in example implementations, the extended majority vote assigns ranking values to hypotheses in a hypothesis space based on region consistency and type consistency, in a manner consistent with the following equation.

$$R(H_{jx} | D_x) = \frac{\sum_{k=1}^{K} tc(H_{jx}, D_{kx}) * rc(H_{jx}, D_{kx})}{K}, \quad (10)$$

where the variable k indicates one of the KNER services, in turn, for the $j^{th}$ hypothesis $H_{jx}$.

The extended majority vote approach does not use further knowledge about the performance of the NER services to derive aggregated results. Incorporating knowledge about the performance of individual NER services can increase the quality of the aggregated results. In particular, the aggregation service can adjust the majority vote using weights that reflect the previously observed quality of the results of individual NER services. For example, the aggregation service uses a precision value $p_k$ for each NER service k, which is determined during training with a training corpus. The precision values $p_k$ are used as weight values $w_k$. In example implementations, the weight values are normalized so their sum is one, and the rank of a given hypothesis is calculated in a mariner consistent with the following equation.

$$R(H_{jx}|D_x) = \sum_{k=1}^{K} tc(H_{jx}, D_{kx}) * rc(H_{jx}, D_{kx}) * w_k \quad (11),$$

where the variable k indicates one of the K NER services, in turn, for the $j^{th}$ hypothesis $H_{jx}$, and $w_k$ represents a weight value for the $k^{th}$ NER service.

C. Error-Driven Approaches.

A given NER service tends to make specific errors such as missing certain types of annotations or identifying annotations that are too long. Some prior approaches consider general transformations and error spaces for NER services, but do not consider relations between entity types for the NER services or consider the errors associated with specific entity types for the respective NER services. Because the performance of a NER service may strongly vary between entity types, considering entity type-specific error rates can improve the quality of aggregated results. For example, if a NER service consistently fails to identify a particular entity type correctly, or consistently fails to identify locations correctly for a particular entity type, the aggregation service can use performance characteristics that it has learned for the NER service to limit the contribution by the NER service during aggregation.

In example implementations, during training, the aggregation service uses entity type-specific error and transformation spaces for the entity types occurring within the evaluation corpus. The aggregation service applies the transfoimation space $T_t$, where a transformation is characterized by the entity types of the ground truth and the NER service output.

In the example implementations, using performance characteristics that were determined during training, the aggregation service performs aggregation in multiple stages. For the first stage aggregation, the aggregation service considers entity type-specific error paths but ignores region correctness. After this first stage, the aggregation service chooses hypotheses for the most likely annotation type or combination of types. For the second stage aggregation, the aggregation service re-evaluates the hypotheses selected from the first stage (having the selected entity type or types), but now considers both type correctness and region correctness. This multi-stage technique emphasizes the importance of type correctness and can help avoid over-fitting the ranking process to the evaluation corpus.

The aggregation service considers the relations between entity types during the evaluation of correctness. For example, if the ground truth indicates that city is the correct entity type for an annotation, the aggregation service can nevertheless consider a location annotation to be correct for a NER service that does not support the action of cities. The aggregation service also considers entity type hierarchies when assigning entity type-specific probabilities and choosing a most specific entity type for which enough data was collected within the evaluation corpus. For example, the aggregation service determines performance characteristics for the entity type location (but not the entity type city) if not enough data is available about performance characteristics for the entity type city. The threshold for whether enough data is available can be a threshold number of annotations in the extraction results, a threshold for the n most common entity types in the extraction results, or some other value.

1. Simple Error Paths Analysis.

When the aggregation service tracks simple errors paths ("SEP"), the aggregation service observes error paths for each NER service independently compared to extraction results that are known to be correct. The aggregation service analyzes each NER service (compared to the ground truth G), and uses performance characteristics it has learned about the NER service during aggregation. This assumes the statistical independence of the NER services and transformations.

During aggregation, based on the conditional probability of a hypothesis $H_{jx}$ given the extracted data $D_x$ for the respective NER. services, the aggregation service determines the rank of the hypothesis $H_{jx}$ in a manner consistent with the following equation:

$$R(H_{jx} | D_x) = \prod_{k=1}^{K} P(H_{jx} | D_{kx}), \quad (12)$$

where the variable k indicates one of the K NER services, in turn, for the $j^{th}$ hypothesis $H_{jx}$. Using the conditional probability of the hypothesis $H_{jx}$ given the extracted data $D_{kx}$ for a NER service, can facilitate creation of the hypotheses and transformation of the extracted data into an appropriate hypothesis. Alternatively, however, the aggregation service determines rank values using conditional probability of the extracted data $D_{kx}$ for a NER service given the hypothesis $H_{jx}$.

The conditional probability of the hypothesis $H_{jx}$ given the extracted data $D_{kx}$ for a NER service k can be estimated by the likelihood of occurrence of certain error paths for the NER service k. For example, during training, the conditional probability $P(H_{jx}|D_{kx})$ can be estimated in a manner consistent with the following equation.

$$P(H_{jx}|D_{kx}) = \prod_{\tau_i \in T_{jk}} \sum_{\tau^{h,d} \in T^t} P_k(s_{\tau_i}(E)|\tau^{h,d}) P_k(\tau^{h,d}), \quad (13)$$

where $h=t(H_{jx})$ and $d=t(D_{kx})$, and where $P_k(s_{\tau_i}(E)|\tau^{h,d})=0$ if $I_{\tau_i}(\tau^{h,d})=0$.

For the first stage (aggregation that considers entity type classifications), the aggregation service will consider the $E_1$ error space (entity type errors, but not region errors). That is, the aggregation service will track failures with respect to entity type classification, but not boundary failures. To observe conditional probabilities for first stage aggregation, using a training corpus, the aggregation service collects statistics about how often a NER service is correct (e.g., $\tau^{ORG,ORG}$), has false negatives (e.g., $\tau^{ORG,NULL}$), has false positives (e.g., $\tau^{NULL,ORG}$) or has other errors (e.g., $\tau'^{ORG,ORG}$) for certain types. For example, during training, in a manner consistent with the following equation, the aggregation service estimates the probability that an entity type error occurs.

$$P_k(s_{\tau_i}(E)|\tau^{h,d}) = P_k(s_{\tau_i}(e_t)|\tau^{h,d}) \quad (14).$$

FIG. 8 illustrates first stage aggregation for NER service output using the SEP approach. As shown in the top part of FIG. 8, the NER service output $D_x$ (810) includes annotations from three NER services Ex1, Ex2 and Ex3. Other annotations are not shown, for the sake of simplicity. The first NER service (Ex1) identifies a city type at location [178; 187], and the third. NER. service (Ex3) identifies a location type at the same location [178; 187]. The second NER service (Ex2) identifies no entity type in the annotation area.

In the middle of FIG. 8, the learned characteristics (821, 822, 823) reflect performance characteristics of the NER services that were observed during training. In particular, the learned characteristics include probability values determined using SEP analysis. For the first NER service (Ex1), the learned characteristics (821) include the probabilities that, if an annotation from the first NER service is city entity type, the corresponding entity type in the ground truth G is a city entity type (0.8), is NULL (0.1) or is an entity type other than city (0.1). Similarly, for the second and third NER services (Ex2, Ex3), the learned characteristics (822) include the probabilities that, if an annotation from the second/third NER service is location entity type, the corresponding entity type in the ground truth G is a location entity type (0.7), is NULL (0.1) or is an entity type other than location (0.2). Cases in which NER service output is NULL are difficult to observe, so a false negative rate is used. For the second NER service (Ex2), tier example, the false negative rate (823) represents the probability that a NULL annotation in the extraction results from the second NER service is erroneous (that is, misses an actual annotation in the ground truth G). In FIG. 8, there is a probability that a location entity type is erroneously missed (0.3) and a probability that any entity type is erroneously missed (0.2). The false negative rates for a NER service can. include a false negative rate for each of one or more specific entity types as well as an average, or overall, false negative rate. For the sake of simplicity, FIG. 8 shows only a small selection of the learned characteristics for the three NER services. Other learned characteristics (e.g., probability values for other entity types as annotations, false negative rates for the first and third NER services) are not shown. Alternatively, the learned characteristics can be organized by entity type in the ground truth G. For example, if an annotation in the ground truth G is the city entity type, the chance of the annotation having the city entity type in extraction results from the first NER service (Ex1) is 0.6, the chance of it having the person entity type is 0.1, and so on.

At the bottom of FIG. 8, the hypotheses (831) include possible annotations in the extraction results from the three NER services Ex1, Ex2 and Ex3. The three hypotheses are: (1) that there is no annotation ($H_{1x}$), (2) that there is a city entity type at location [178; 187] ($H_{2x}$), and (3) that there is a location entity type at location [178; 187] ($H_{3x}$). For these hypotheses, the rankings (832) are determined using the learned characteristics (821, 822, 823). In particular, the aggregation service estimates the probabilities for the respective hypotheses by multiplying the observed distributions of error patterns for the NER services. If the first hypothesis is true (no annotation), according to the equation (12), the ranking value is the product of the probabilities from the first NER service (that city entity type should have been NULL), the second NER service (that NULL is correct, or 1.0–fn rate) and the third NER service (that location entity type should have been NULL): 0.1×(1.0–0.2)×0.1=0.008. If the second hypothesis is true (city entity type at location [178; 187]), the ranking value is the product of the probabilities from the first NER service (that city entity type is correct), the second NER service (that NULL is not correct due to a missed location annotation) and the third NER service (that location entity type is correct, because the narrowest supported entity type that could be correct for city is location for the third NER service): 0.8×0.3×0.7=0.168. If the third hypothesis is true (location entity type at location [178; 187]), the ranking value is the product of the probabilities from the first NER service (that city entity type should have been another entity type), the second NER service (that NULL is not correct due to a missed location annotation) and the third NER service (that location entity type is correct): 0.1×0.3×0.7=0.021.

For the second stage aggregation in the SEP approach, the aggregation service will consider type errors and region errors (that is, error space $E_2$). Assuming that type errors and region errors are not independent, the aggregation service can use error classes as follows.

CORRECT: $s_{\tau_i}(e_t)=0$ and $s_{\tau_i}(e_r)=0$
ERROR1: $s_{\tau_i}(e_t)=0$ and $s_{\tau_i}(e_r)=1$
ERROR2: $s_{\tau_i}(e_t)=1$ and $s_{\tau_i}(e_r)=0$
ERROR3: $s_{\tau_i}(e_t)=1$ and $s_{\tau_i}(e_r)=1$ That is, the four categories of error class (ec) are (1) no error, (2) presence of a region error but not an entity type error, (3) presence of an entity type error but not a region error, and (4) presence of both an entity type error and a region error. Based on the ec that occurs within $\tau_i$, during training, in a manner consistent with the following equation, the aggregation service estimates the probability that an entity type error and/or region error occurs.

$$P_k(s_{\tau_i}(E)|\tau^{h,d}) = P_k(s_{\tau_i}(ec)|\tau_{h,d}) \quad (15).$$

The aggregation service obtains the probability estimates for NER service k, for transformations $\tau^{h,d}$ from NER service output to hypotheses, during the training process. FIG. 9 shows an example way to obtain the probability estimates $\hat{P}_k(\tau^{h,d})$ from observed errors during training.

As shown in FIG. 9, the aggregation service differentiates between cases where the NER service output is empty or not. The aggregation service can observe the frequency of empty annotations, as long as the ground truth is not empty. Predictions on the likelihood and kind of entity type that was missed by the NER service, however, depend on the number of entity types and their distributions. Thus, as in training for first stage aggregation, instead of using probabilities that a NULL annotation should be specific entity types, the aggregation service uses a false negative rate per specific entity type or group of entity types. The likelihood that both the hypothesis and NER service output are empty cannot directly be observed during the training process. Thus, the aggregation service estimates this probability with $1-\hat{P}_k(\tau_k^{NULL,NULL})$. In addition, to avoid over-fitting, the aggregation service abstracts the transformation space and summarizes transformation cases where the NER service output is not equal to NULL into cases where the entity type of the ground truth is NULL and cases where the entity type of the ground truth is not equal to NULL.

2. Pairwise Error Paths Analysis.

When the precision or recall of NER services is low (e.g., below 50%), the SEP approach can produce aggregated results that are counter-intuitive. For example, suppose the NER service output includes the following annotations.

Ex1: ([0; 6], SAP AG, ORG)
Ex2: ([0; 6], SAP AG, ORG)
Ex3: ([0; 6], SAP AG, ORG)
Ex4: ([0; 6], SAP AG, ORG)
Ex5: ( )

Four of the five NER services detect SAP AG as named entity at the same location [0; 6] and classify it as organization (ORG). This provides very good evidence that the ORG annotation is a true positive annotation. Suppose that the probability of all five NER service is 0.4 for an ORG annotation corresponding to an ORG in the ground truth, and 0.6 for an ORG annotation corresponding to NULL in the ground truth, and that the false negative rate is 0.6. According to equation (12), the probability that the hypothesis ([0; 6], SAP AG, ORG) is true is $(0.4)^4 * 0.6 = 0.015$. In contrast, the probability that the NULL hypothesis is true is $(0.6)^4 * (0.4) = 0.052$. The selection of the NULL hypothesis as the aggregated result, which follows from the low precision of the NER services that provide the uniform results, would most likely be deemed incorrect by a human reviewing the extraction results. This counter-intuitive result is caused by the aggregation service not considering correlations between the performance characteristics of the different NER services.

To overcome such limitations, the aggregation service can use an aggregation approach that incorporates correlations between performance characteristics of NER services. The aggregation service analyzes pairs of NER service (compared to the ground truth G), and uses performance characteristics it has learned about the pairs of NER services during aggregation. For example, if two NER services indicate an annotation has entity type ORG, the aggregation service observes how likely the entity type is ORG in the ground truth G, how likely the entity type is something else in the ground truth G, and how likely the result is NULL in the ground truth G. In example implementations, the aggregation service observes pairwise relations between performance characteristics of NER services, e.g., tracking error paths for pairs of NER services.

During aggregation, the aggregation service can determine ranking values for hypotheses using pairwise error paths ("PEP") analysis in a manner consistent with the following equation, which is similar to equation (12).

$$R(H_{jx} | D_x) = \prod_{k=1}^{K} \prod_{l=k}^{K} P(H_{jx} | D_{kx}, D_{lx}), \quad (16)$$

where the variable k indicates one of the KNER services, in turn, for the $j^{th}$ hypothesis $H_{jx}$, and the variable l indicates another one of the K NER services. The values determined with this ranking function typically decrease as K grows, but the values are still proportional to the likelihood of $P(H_{jx}|D_x)$ and hence suitable for use in ranking operations.

For PEP analysis, the aggregation service uses an alternative transformation space $\tau^{h,k1,k2}$, where $h=t(H_{jx})$, $d1=t(D_{kx})$ and $d2=t(D_{lx})$. The alternative transformation space is characterized by the entity type information of the hypothesis and two NER services (e.g., $\tau^{NULL,ORG,ORG}$). The aggregation service estimates probabilities in a manner analogous to probability estimation in the SEP approach, but with a modified transformation and error space. For example, during training, the aggregation service estimates probabilities in a manner consistent with the following equation.

$$P(H_{jx} | D_{kx}, D_{lx}) = \prod_{\tau_i \in T_{jk}} \sum_{\tau^{h,d1,d2} \in T} P_{kl}(s_{\tau_i}(E) | \tau^{h,d1,d2}, rc(D_{kx}, D_{lx})) \cdot \quad (17)$$
$$P_{kl}(\tau^{h,d1,d2}, rc(D_{kx}, D_{lx})).$$

Within $\tau^{h,d1,d2}$, the aggregation service differentiates between cases where $rc(D_{kx},D_{lx})$ is 1 (that is, both have the same annotation location) or 0. (This is for second stage aggregation. in first stage aggregation, considering only entity type correctness, region consistency is not considered.)

For first stage aggregation, the aggregation service will account for entity type correctness. The aggregation service uses entity type correctness of the single NER outputs: t if $tc(D_{kx})=1$, else f. Based on this information about the entity type correctness of the single NER outputs, the aggregation service uses the following error classes for pairs of NER services: tt (entity types correct in output for both NER services), tf (entity type correct in output only for first NER service), ft (entity type correct in output only for second NER service), and ff (entity type not correct in output for either NER service).

For second stage aggregation, the error space is adapted. The error classes are more fine-grained., using single error types that depend on entity type consistency and region consistency: t if $tc(D_{kx})=1$ and $rc(D_{kx})=1$, and p if $tc(D_{kx})=1$ and $rc(D_{kx})=0$, else f. Based on this information about the entity type correctness, the aggregation service uses the following error classes for pairs of NER services: tt, tf, ff, tp, pt, pp, fp, and pf. Based on the error cases that occur, during training, in a manner consistent with the following equation, the aggregation service estimates the probabilities that will be used during aggregation.

$$P_{kl}(s_{\tau_i}(E)|\tau^{h,k1,k2}) = P_{kl}(s_{\tau_i}(ec)|\tau^{h,k1,k2}) \quad (18).$$

The probability estimates for the NER services k and l in combination are calculated with the help of the information observed during training, in a process analogous to the one shown in FIG. 9.

3. Other Aggregation Approaches.

Alternatively, the aggregation service uses another aggregation approach.

The aggregation service can combine the results from two aggregation approaches. For example, the aggregation service multiplies ranking values from an extended majority vote with ranking values from SEP analysis. This can help overcome some of the drawbacks of SEP analysis with respect to correlations among performance characteristics of low-precision NER services.

C. Enhancements.

In example implementations, the aggregation service can use any of several variations to further improve the quality of aggregation.

For example, the aggregation service can consider extraction results from only the K best NER services during aggregation, where a larger number of NER services was evaluated during training.

Or, as another example, the aggregation service can apply "bagging" during aggregation. Bagging (bootstrap aggregating) uses model averaging to combine the results of single aggregation models, so as to improve accuracy and avoid over-fitting. In one technique, the aggregation service combines results determined using different aggregation models of one aggregation approach. In this case, the training corpus is randomly split into subsets that are then used to train the different aggregation models. In another technique, the aggregation service combines results determined using aggregation models with diverse aggregation approaches. The results from applying different aggregation models onto annotation areas of a document corpus can be combined by majority vote or weighted majority vote.

Or, as another example, the aggregation service can apply techniques such as "stacking" or "boosting" during aggregation. Stacking and boosting rely on a sequential training of NER services and the aggregation service. If the NER services are not adjustable (e.g., if they are provided by a third party), training the NER services is infeasible, but the aggregation service can still train various aggregation approaches in sequential order.

Or, as another example, the aggregation service can use a tuning parameter to trade off precision and recall. The tuning parameter can be adjusted through a slider control or other user interface element. In general, the tuning parameter can change the focus of the system to high precision, high recall, or something between high precision and high recall. The aggregation service can increase or decrease the probability estimate for the NULL hypothesis depending on the tuning parameter (increasing the probability estimate for the NULL hypothesis when the tuning parameter favors precision, and decreasing the probability estimate for the NULL hypothesis when the tuning parameter favors recall). The tuning parameter can be calibrated during training with the testing corpus. Voting approaches tend to have better precision than error-driven approaches, but the tuning parameter can override such tendencies.

The aggregation service can weight the performance improvement associated with an aggregation approach (or enhancement) against the cost of using the approach (or enhancement). The aggregation service can select an aggregation approach that is expected to perform best for a given type of document corpus (category). Or, the aggregation approach can select an aggregation approach based on other criteria (e.g., computational complexity, reliability of training data).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system, a method comprising:
providing a plurality of documents specified in an extraction task to each of multiple different named entity recognition ("NER") services;
for each of the multiple different NER services, receiving extraction results generated for the plurality of documents specified in the extraction task;
identifying one or more annotations among multiple annotations in the extraction results
selecting a first annotation of a first NER service of the multiple different NER services as putatively corresponding to a second annotation of a second NER service of the multiple different NER services;
determining a first entity type applied to the first annotation by the first NER service;
determining a second entity type applied to the second annotation by the second NER service;
determining that the first and second entity types are elements of a set of hierarchically-related entity types;
determining that the first entity type is narrower than the second entity type;
based at least in part on determining that the first entity type is narrower than the second entity type, selecting the first entity type, and not selecting the second entity type, for a third annotation, corresponding to the first and second annotations, in an aggregation result for the aggregation task; and
returning to a requesting user or a requesting application the aggregation result.

2. The method of claim 1, further comprising:
determining one or more hypotheses, each hypothesis comprising an annotation set comprising a plurality of annotations for the extraction results of one or more of the multiple different NER services, each annotation comprising a type or subtype; and
ranking each of the one or more hypotheses based at least in part on a difference in type-consistency between the one or more hypotheses, the ranking for a hypothesis being based at least in part on agreement between the hypothesis and the annotation set for each of a plurality of the multiple different NER services.

3. The method of claim 2, further comprising:
ranking each of the one or more hypotheses based at least in part on a difference in region-consistency between the one or more hypotheses, the ranking for a hypothesis being based at least in part on agreement between the hypothesis and the annotation set of each of a plurality of the multiple NER services.

4. The method of claim 1, further comprising:
determining one or more hypotheses, each hypothesis comprising an annotation set comprising a plurality of annotations, each annotation comprising a type or subtype and a location; and
ranking each of the one or more hypotheses based at least in part on a difference in region-consistency between the one or more hypotheses, the ranking for a hypothesis being based at least in part on agreement between the hypothesis and the annotation set of each of a plurality of the multiple NER services.

5. The method of claim 4, wherein determining the one more hypotheses comprises determining a plurality of hypotheses.

6. The method of claim 1, further comprising converting an entity type of a first entity type schema of the first NER service to a standard entity type schema.

7. The method of claim 1, wherein the first entity type is not inconsistent with the second entity type.

8. One or more non-transitory computer-readable media comprising:
computer-executable instructions that, when executed, cause a computing system to provide a plurality of documents specified in an extraction task to each of multiple different named entity recognition ("NER") services;
computer-executable instructions that, when executed, cause the computing system to, for each of the multiple different NER services, receive extraction results generated for the plurality of documents specified in the extraction task;
computer-executable instructions that, when executed, cause the computing system to identify one or more annotations among multiple annotations in the extraction results
computer-executable instructions that, when executed, cause the computing system to select a first annotation of a first NER service of the multiple different NER services as putatively corresponding to a second annotation of a second NER service of the multiple different NER services;
computer-executable instructions that, when executed, cause the computing system to determine a first entity type applied to the first annotation by the first NER service;
computer-executable instructions that, when executed, cause the computing system to determine a second entity type applied to the second annotation by the second NER service;
computer-executable instructions that, when executed, cause the computing system to determine that the first and second entity types are elements of a set of hierarchically-related entity types;
computer-executable instructions that, when executed, cause the computing system to determine that the first entity type is narrower than the second entity type;
computer-executable instructions that, when executed, cause the computing system to, based at least in part on determining that the first entity type is narrower than the second entity type, select the first entity type, and not select the second entity type, for a third annotation, corresponding to the first and second annotations, in an aggregation result for the aggregation task; and
computer-executable instructions that, when executed, cause the computing system to return to a requesting user or a requesting application the aggregation result.

9. The one or more non-transitory computer-readable media of claim 8, further comprising:
computer-executable instructions that, when executed, cause the computing system to determine one or more hypotheses, each hypothesis comprising an annotation set comprising a plurality of annotations for the extraction results of one or more of the multiple different NER services, each annotation comprising a type or subtype; and
computer-executable instructions that, when executed, cause the computing system to rank each of the one or more hypotheses based at least in part on a difference in type-consistency between the one or more hypotheses, the ranking for a hypothesis being based at least in part on agreement between the hypothesis and the annotation set for each of a plurality of the multiple different NER services.

10. The one or more non-transitory computer-readable media of claim 9, further comprising:
computer-executable instructions that, when executed, cause the computing system to rank each of the one or more hypotheses based at least in part on a difference in region-consistency between the one or more hypotheses, the ranking for a hypothesis being based at least in part on agreement between the hypothesis and the annotation set of each of a plurality of the multiple NER services.

11. The one or more non-transitory computer-readable media of claim 8, further comprising:
computer-executable instructions that, when executed, cause the computing system to determine one or more hypotheses, each hypothesis comprising an annotation set comprising a plurality of annotations, each annotation comprising a type or subtype and a location; and
computer-executable instructions that, when executed, cause the computing device to rank each of the one or more hypotheses based at least in part on a difference in region-consistency between the one or more hypotheses, the ranking for a hypothesis being based at least in part on agreement between the hypothesis and the annotation set of each of a plurality of the multiple NER services.

12. The one or more non-transitory computer-readable media of claim 11, wherein determining the one more hypotheses comprises determining a plurality of hypotheses.

13. The one or more non-transitory computer-readable media of claim 8, wherein the first entity type is not inconsistent with the second entity type.

14. A computing system comprising:
memory;
one or more processing units coupled to the memory; and
one or more non-transitory computer readable storage media storing instructions that, when loaded into the memory, cause the one or more processing units to perform operations for:
providing a plurality of documents specified in an extraction task to each of multiple different named entity recognition ("NER') services;
for each of the multiple different NER services, receiving extraction results generated for the plurality of documents specified in the extraction task;
identifying one or more annotations among multiple annotations in the extraction results
selecting a first annotation of a first NER service of the multiple different NER services as putatively corresponding to a second annotation of a second NER service of the multiple different NER services;
determining a first entity type applied to the first annotation by the first NER service;
determining a second entity type applied to the second annotation by the second NER service;
determining that the first and second entity types are elements of a set of hierarchically-related entity types;
determining that the first entity type is narrower than the second entity type;
based at least in part on determining that the first entity type is narrower than the second entity type, selecting the first entity type, and not selecting the second entity type, for a third annotation, corresponding to the first and second annotations, in an aggregation result for the aggregation task; and
returning to a requesting user or a requesting application the aggregation result.

15. The system of claim 14, the operations further comprising:
- determining one or more hypotheses, each hypothesis comprising an annotation set comprising a plurality of annotations for the extraction results of one or more of the multiple different NER services, each annotation comprising a type or subtype; and
- ranking each of the one or more hypotheses based at least in part on a difference in type-consistency between the one or more hypotheses, the ranking for a hypothesis being based at least in part on agreement between the hypothesis and the annotation set for each of a plurality of the multiple different NER services.

16. The system of claim 15, the operations further comprising:
- ranking each of the one or more hypotheses based at least in part on a difference in region-consistency between the one or more hypotheses, the ranking for a hypothesis being based at least in part on agreement between the hypothesis and the annotation set of each of a plurality of the multiple NER services.

17. The system of claim 14, the operations further comprising:
- determining one or more hypotheses, each hypothesis comprising an annotation set comprising a plurality of annotations, each annotation comprising a type or subtype and a location; and
- ranking each of the one or more hypotheses based at least in part on a difference in region-consistency between the one or more hypotheses, the ranking for a hypothesis being based at least in part on agreement between the hypothesis and the annotation set of each of a plurality of the multiple NER services.

18. The system of claim 17, wherein determining the one more hypotheses comprises determining a plurality of hypotheses.

19. The system of claim 14, the operations further comprising converting an entity type of a first entity type schema of the first NER service to a standard entity type schema.

20. The system of claim 14, wherein the first entity type is not inconsistent with the second entity type.

* * * * *